US012633843B2

(12) United States Patent　　　(10) Patent No.: US 12,633,843 B2
Moon et al.　　　　　　　　　　　(45) Date of Patent: May 19, 2026

(54) DUAL MULTI-LEVEL INVERTER TOPOLOGY WITH REDUCED SWITCH COUNT AND SMALL DC-LINK CAPACITOR

(71) Applicants: The Florida State University Research Foundation, Inc., Tallahassee, FL (US); The Board of Trustees of Michigan State University, East Lansing, MI (US); GM Global Technology Operations LLC, Detroit, MI (US)

(72) Inventors: Jinyeong Moon, Tallahassee, FL (US); Woongkul Lee, East Lansing, MI (US); Muhammad Alvi, Detroit, MI (US)

(73) Assignees: The Florida State University Research Foundation, Inc., Tallahassee, FL (US); The Board of Trustees of Michigan State University, East Lansing, MI (US); GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 18/146,960

(22) Filed: Dec. 27, 2022

(65) Prior Publication Data

US 2023/0238895 A1　　Jul. 27, 2023

Related U.S. Application Data

(60) Provisional application No. 63/266,101, filed on Dec. 28, 2021.

(51) Int. Cl.
H02M 7/487 (2007.01)
H02M 1/12 (2006.01)
H02M 1/00 (2006.01)

(52) U.S. Cl.
CPC .......... *H02M 7/487* (2013.01); *H02M 1/123* (2021.05); *H02M 1/009* (2021.05)

(58) Field of Classification Search
CPC ..................................................... H02M 7/487
See application file for complete search history.

(56) References Cited

U.S. PATENT DOCUMENTS

| | | | | |
|---|---|---|---|---|
| 9,001,544 | B2 * | 4/2015 | Itoh ....................... | H02M 7/483 |
| | | | | 363/132 |
| 10,886,832 | B2 * | 1/2021 | Yoscovich .......... | H02M 1/0095 |
| 2013/0155747 | A1 * | 6/2013 | Wang .................... | H02M 7/487 |
| | | | | 363/132 |
| 2013/0285591 | A1 * | 10/2013 | Suzuki ................... | H02P 21/22 |
| | | | | 318/724 |
| 2022/0140748 | A1 * | 5/2022 | Toda ................... | H02M 7/5387 |
| | | | | 363/132 |

OTHER PUBLICATIONS

B. Ji, J. Wang and J. Zhao, "High-Efficiency Single-Phase Transformer-less Pv H6 Inverter With Hybrid Modulation Method, " in IEEE Transactions on Industrial Electronics, vol. 60, No. 5, pp. 2104-2115, May 2013 (Year: 2013).*

* cited by examiner

*Primary Examiner* — Peter M Novak
(74) *Attorney, Agent, or Firm* — Eversheds Sutherland (US) LLP

(57) ABSTRACT

A dual multi-level inverter topology with reduced switch count and small DC-link capacitor is provided. The inverter topology provides multi-level inverter operation without requiring a neutral point connection that is commonly present in a stacked capacitor topology (for example, a topology including two capacitors).

11 Claims, 32 Drawing Sheets

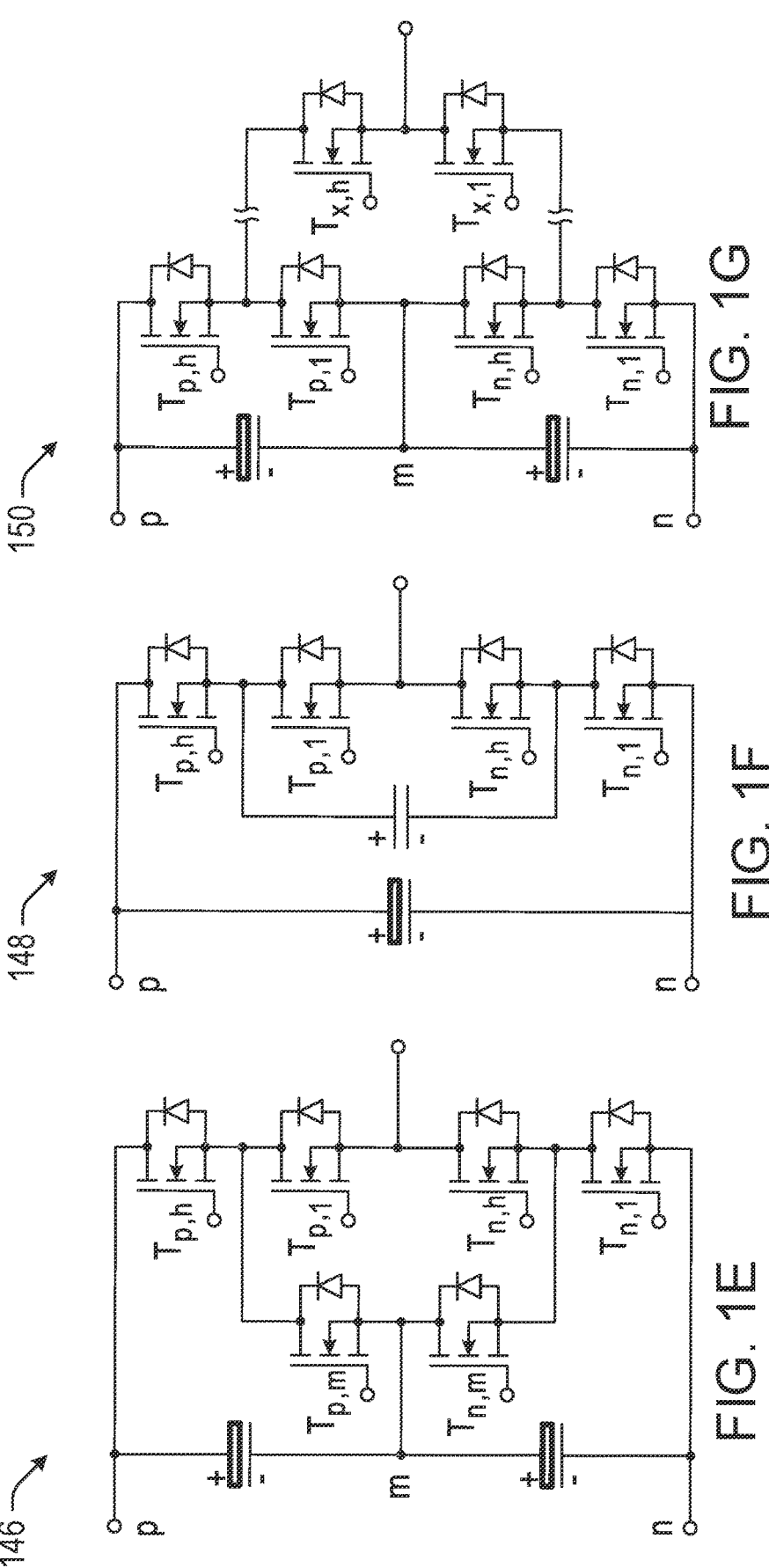

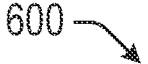
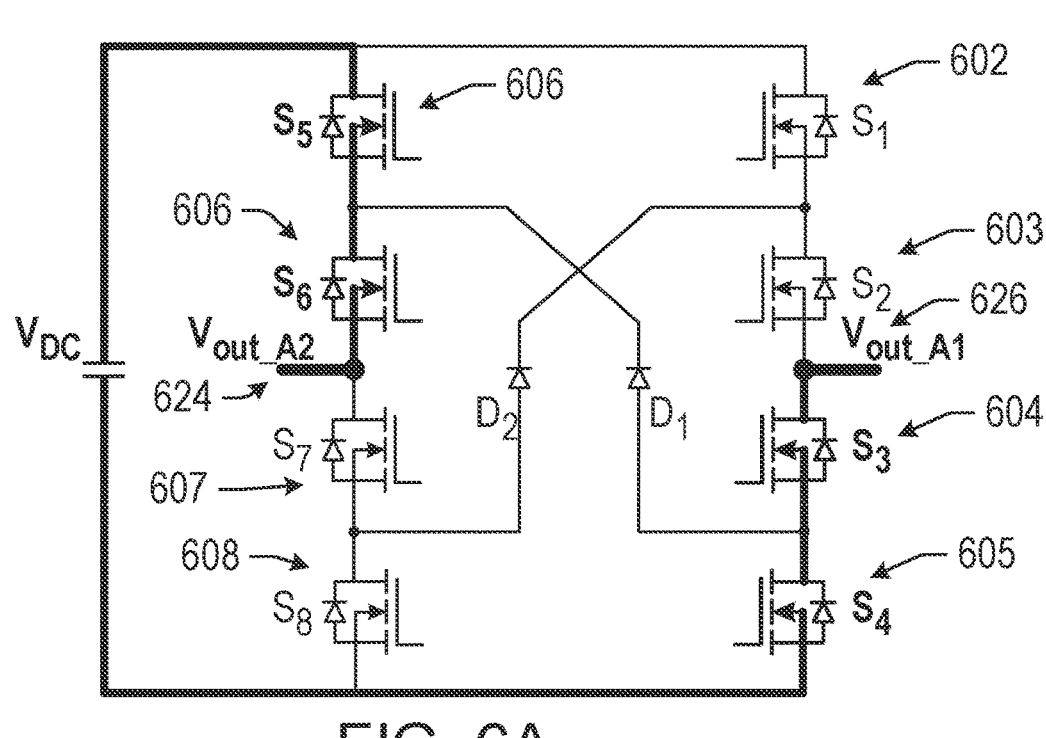
FIG. 6A
FIG. 6B

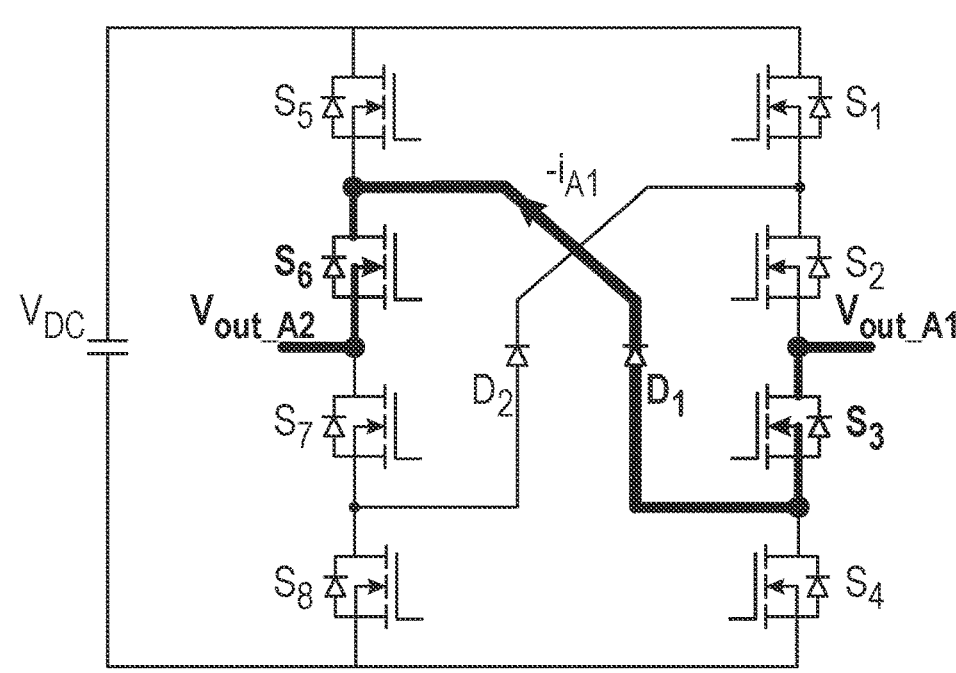
FIG. 6C
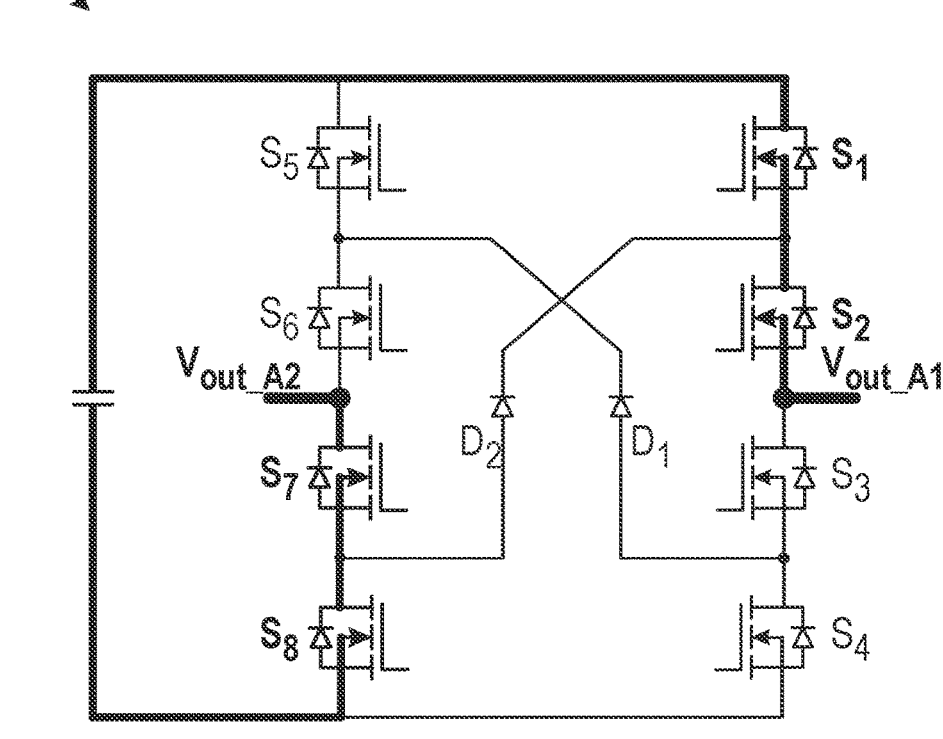
FIG. 6D

920

$V_{DC}$

1300

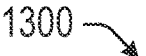
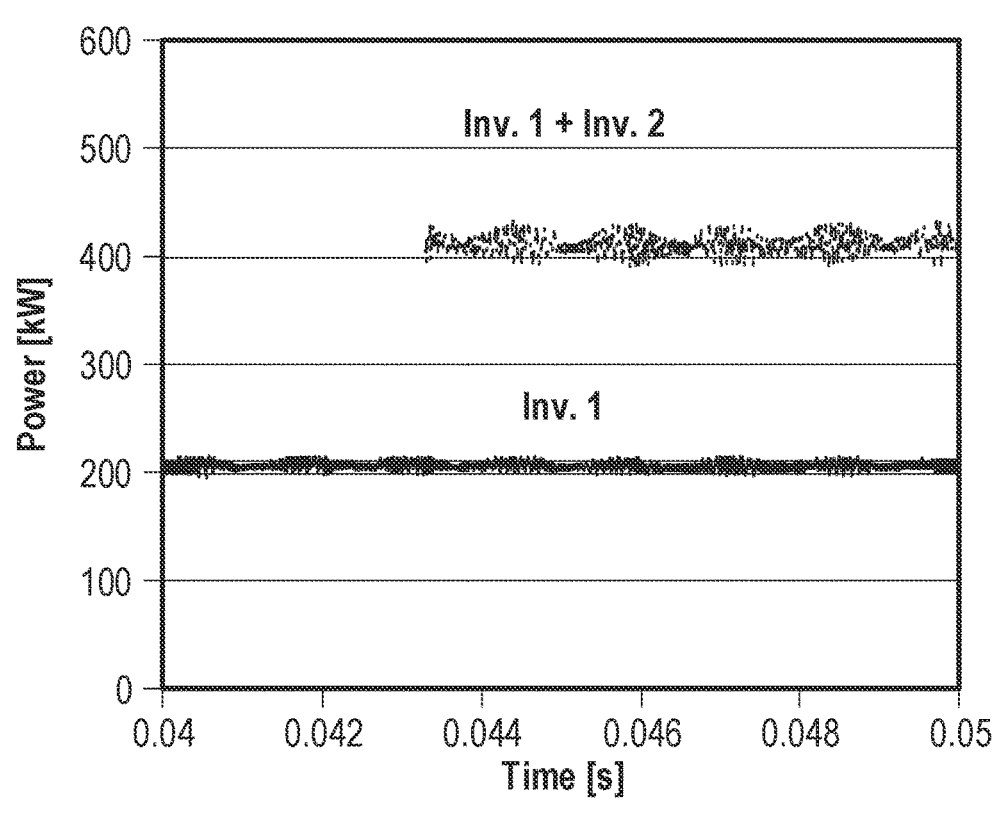
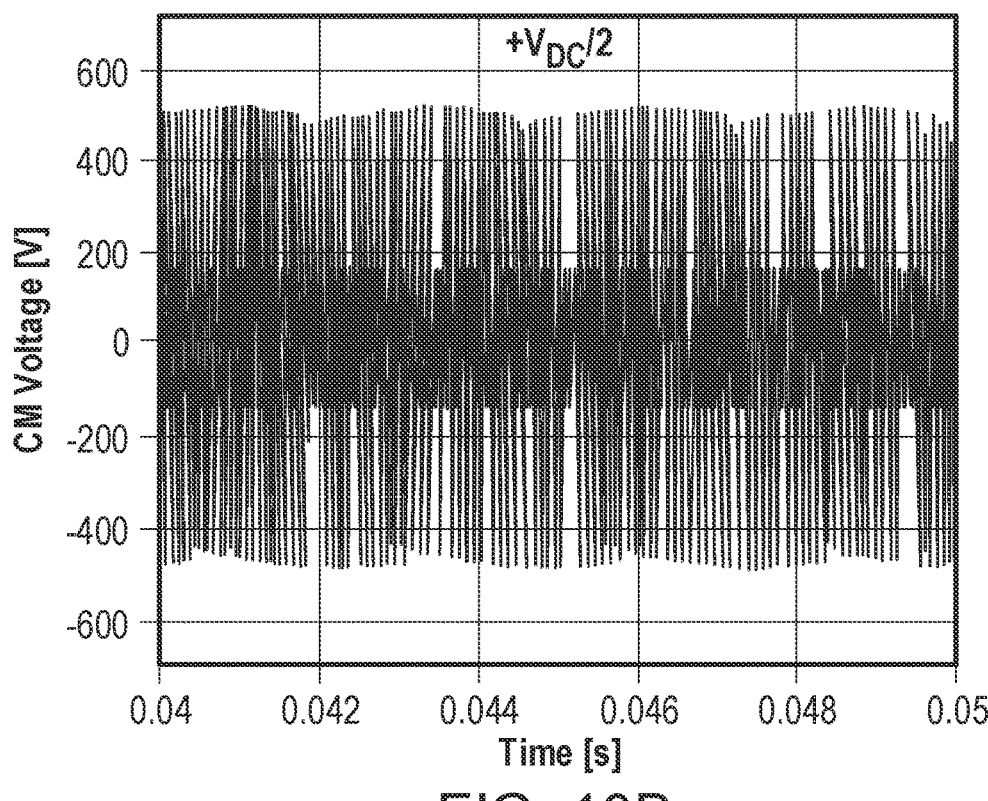
FIG. 13B

1300

1320

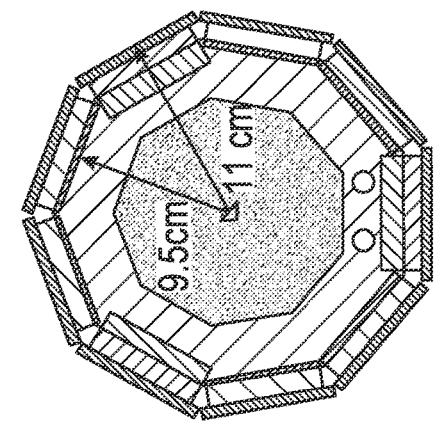
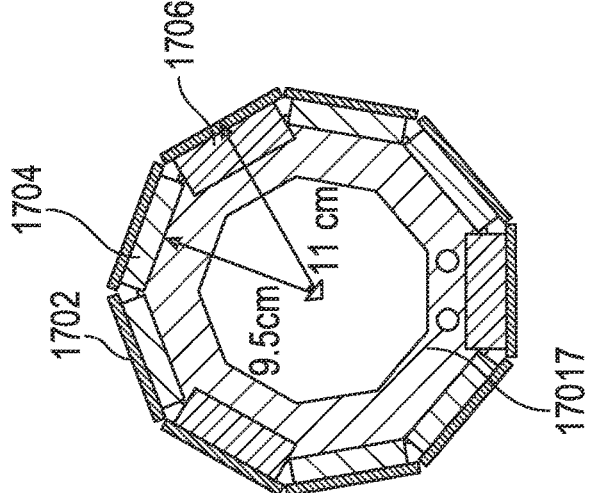
FIG. 17

1900

95.24 kW/L 133.33 kW/L 200 kW/L

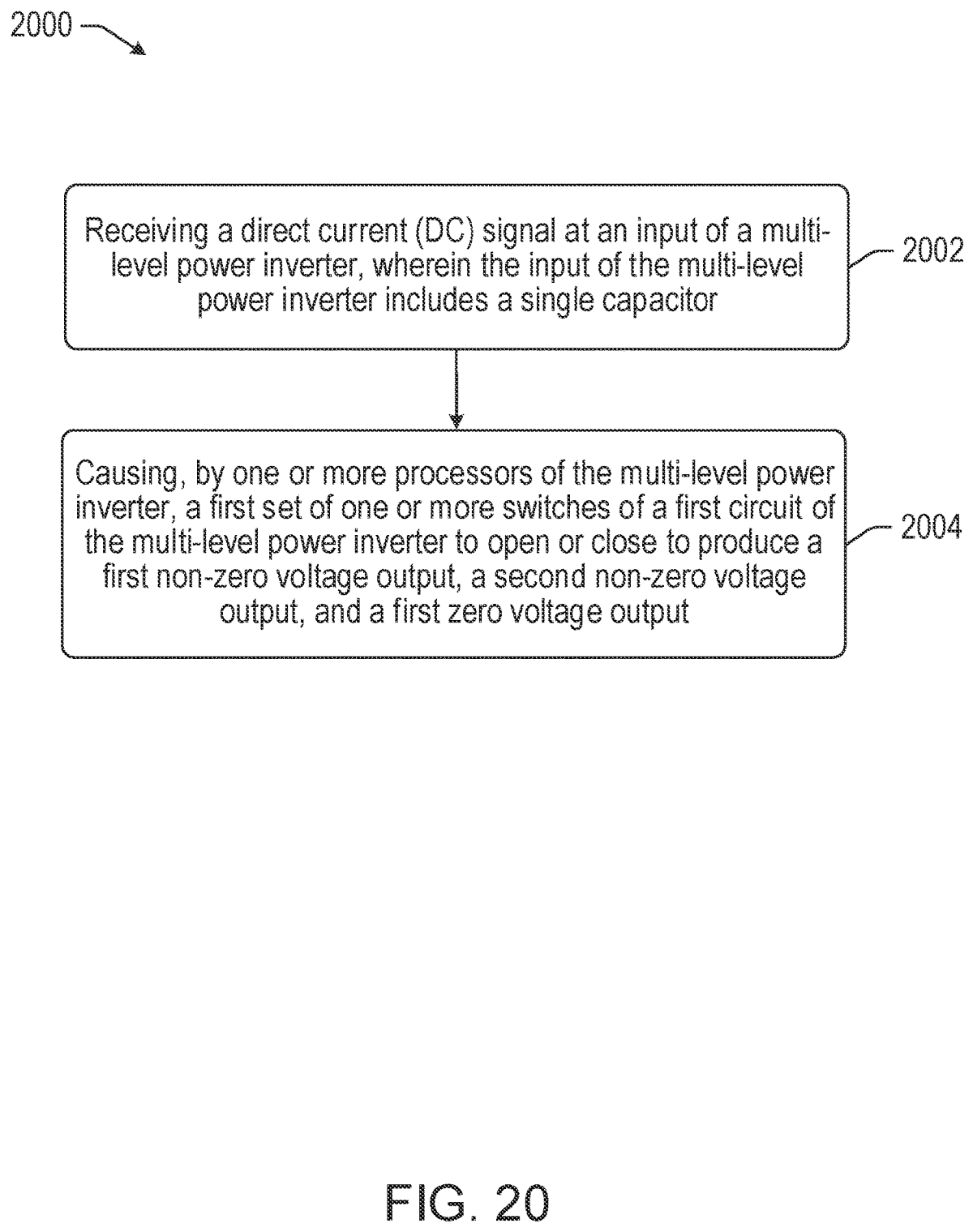

2000 ⟍

Receiving a direct current (DC) signal at an input of a multi-level power inverter, wherein the input of the multi-level power inverter includes a single capacitor ⟋ 2002

Causing, by one or more processors of the multi-level power inverter, a first set of one or more switches of a first circuit of the multi-level power inverter to open or close to produce a first non-zero voltage output, a second non-zero voltage output, and a first zero voltage output ⟋ 2004

FIG. 20

DUAL MULTI-LEVEL INVERTER TOPOLOGY WITH REDUCED SWITCH COUNT AND SMALL DC-LINK CAPACITOR

CROSS-REFERENCE TO RELATED APPLICATIONS

This application claims priority to and benefit of U.S. provisional patent application No. 63/266,101, filed Dec. 28, 2021, which is herein incorporated by reference.

BACKGROUND

With the electric vehicle market growing, there is an increased interest in inverters that are able to provide a certain level of functionality, while still also falling within constraints (for example, size constraints to reduce the amount of space in the vehicle that the inverter occupies). Conventional two-level inverter topologies provide a modular design, reduced DC-link capacitor size, and higher power density. However, this power density is still less than the half of the Department of Energy's 2025 target of 100 kW/L.

One approach to addressing some of the issues associated with such inverters may involve using a multi-level inverter design. This type of design may reduce switching loss, common-mode electromagnetic interference (CM EMI) noise, and winding insulation stress. This design may also reduce current ripple for smoother torque generation and may provide variable output voltage operation. However, typical multi-level inverters may be associated with challenges, such as the increased size of this design configuration (for example, because a split capacitor is used with neutral current), an increased switch count, and unbalanced loss distribution (which may result in cooling complexity increases).

BRIEF SUMMARY

A multi-level inverter is provided. In one or more embodiments, the multi-level inverter includes: (i) a first circuit comprising a first set of one or more switches configured to produce a first non-zero voltage output, a second non-zero voltage output, and a first zero voltage output and (ii) a single capacitor connected in parallel with the first circuit.

In another aspect, a system is provided. In one or more embodiments, the system includes a direct current (DC) power source. In one or more embodiments, the system also includes a multi-level inverter configured to receive a DC signal from the DC power source. In one or more embodiments, the multi-level inverter includes: (i) a first circuit comprising a first set of one or more switches configured to produce a first non-zero voltage output, a second non-zero voltage output, and a third zero voltage output and (ii) a single capacitor connected in parallel with the first circuit. In one or more embodiments, the system also includes one or more loads that receive the first non-zero voltage output and the non-zero voltage output from the multi-level inverter.

In still another aspect, a method is provided. In one or more embodiments, the method includes: (i) receiving a direct current (DC) signal at an input of a multi-level power inverter, wherein the input of the multi-level power inverter includes a single capacitor and (ii) causing, by one or more processors of the multi-level power inverter, a first set of one or more switches of a first circuit of the multi-level power inverter to open or close to produce a first non-zero voltage output, a second non-zero voltage output, and a first zero voltage output.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 1A-1G illustrate example stacked capacitor multi-level inverter topologies, in accordance with one or more embodiments of the disclosure.

FIGS. 6A-6D illustrate operation of a phase leg of an X-type single-capacitor multi-level inverter topology, in accordance with one or more embodiments of the disclosure.

FIGS. 13A-13F illustrate example plots of signals associated with an example multi-level inverter topology, in accordance with one or more embodiments of the disclosure.

FIG. 17 illustrates an example of a circular NPL H-type inverter design, in accordance with one or more embodiments of this disclosure.

FIG. 20 illustrates an example method, in accordance with one or more embodiments of this disclosure.

DETAILED DESCRIPTION

Figure 1A:
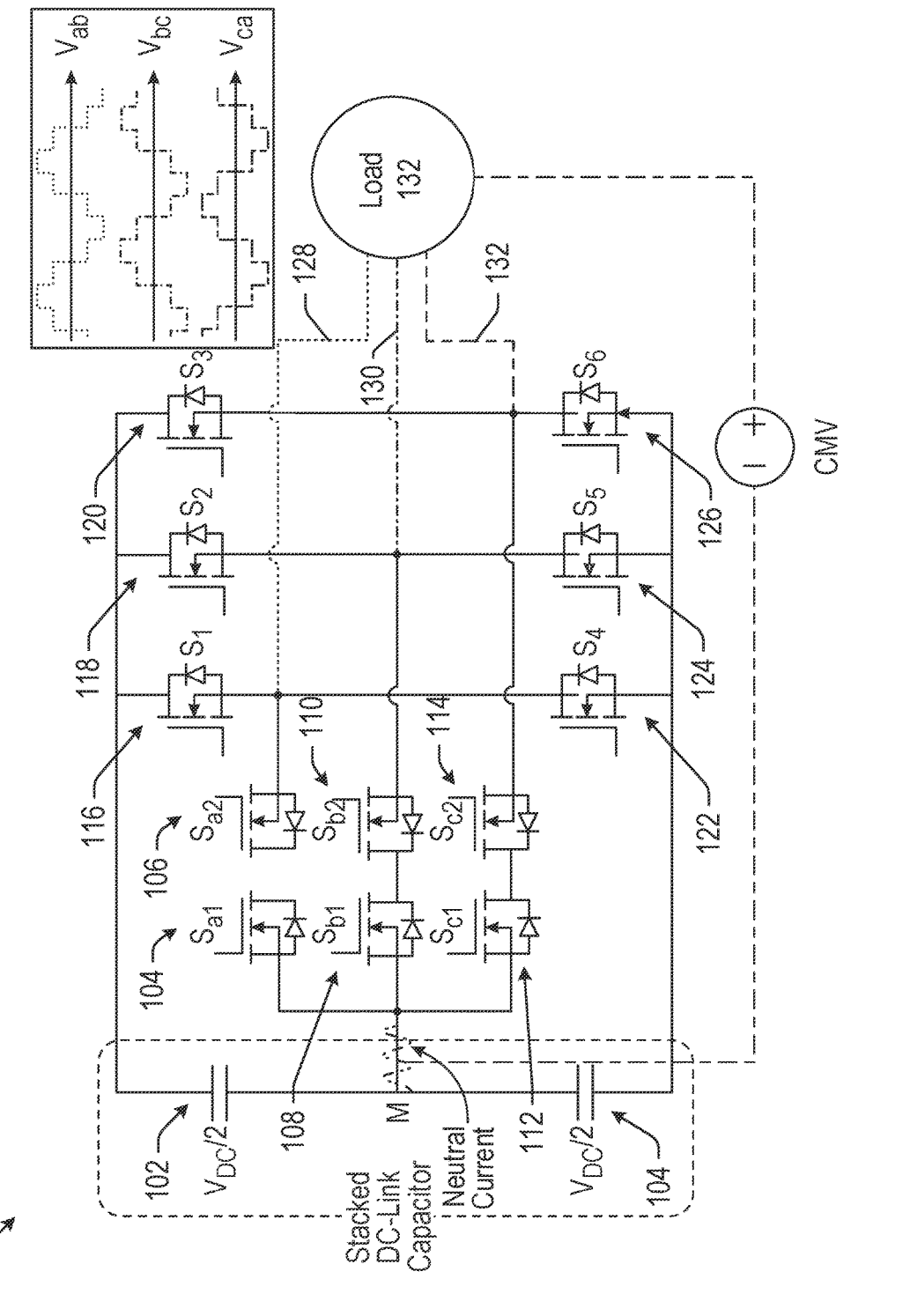

Described herein is a multi-level inverter topology that provides multi-level inverter operation without requiring a neutral point connection that is commonly present in a stacked capacitor topology (for example, a topology including two capacitors). This multi-level inverter design may result in a smaller form factor inverter that is also associated with a longer lifetime compared to conventional inverter designs. In this manner, the multi-level inverter design described herein may be advantageous because the operational benefits of the multi-level inverter may be obtained while also mitigating the size increase that is often accompanied by a conventional multi-level inverter design. In one or more embodiments, the inverters may be used in light, medium, or heavy-duty vehicles. Given this, the ability to achieve the advantages of the multi-level inverter design without requiring a larger inverter to be placed within the vehicle is beneficial. However, the inverters may also be used in various other contexts as well.

Wide-bandgap semiconductor (WBG) devices, such as silicon carbide (SiC) and gallium nitride (GaN) allow for efficiency increases in alternating current (AC) machine drives. These types of devices may be used in high-performance and high-power density machine drives used in automotive, aerospace, and industrial applications, for example. Although high slew rate (e.g., usually in the range of 10-50 V/ns) from WBG devices significantly reduces loss during switching events, the magnitudes of ground leakage current, bearing current, and common-mode electromagnetic interference emission (CM EMI) magnitudes also increase because conventional two-level PWM inverters generate high-frequency, high-level common-mode voltages (CMVs).

To mitigate these problems in AC machine drives, various conventional solutions currently exist. As a first example, one conventional solution involves the use of a common-mode choke to suppress the ground leakage current. As a second example, insulate methods applied to the bearings of the inverter may be used to reduce bearing current. As a third example, common-mode (CM) filters are commonly used to mitigate CM EMI noise magnitude. However, these solutions do not account for the source of CMV. As a fourth example, several PWM techniques have been proposed to reduce CMV magnitude by avoiding zero switching states. However, these solutions lead to performance reduction because the current harmonics were increased. As a fifth example, a CMV cancellation may be used in pulse width modulated (PWM) motor drives with balanced six-phase inverter topology. The balanced inverter topology provides equal and opposite six phases voltage outputs and creates two CMVs from each three-phase with two-level line-to-line voltage output. The CMVs are canceled because the two CMVs are equal and opposite. However, this topology only produces two levels of voltage outputs.

Additionally, multi-level inverters (MLIs) are often used in high-power and high-voltage applications due to advantages such as low current and voltage harmonics, high efficiency, low voltage stress on the switching devices, and low EMI noise magnitude. One type is MLI is the T-type inverter, which may provide lower switching loss and higher efficiency than the conventional two-level inverters. However, the T-type inverter requires a middle point connection between two stacked DC-link capacitors, as shown in FIGS. 1A-1G. This stacked DC-link capacitor topology results in a neutral current at three times the fundamental frequency along this middle point, leading to undesirable capacitor voltage unbalance. This current also continuously deviates the capacitor voltage to unacceptable levels, causing overvoltage damage to switching devices, output voltage and/or current distortion, and high voltage stress on capacitors.

Various advanced modulation techniques and additional passive balancing circuits have been proposed to reduce this neutral current in multi-level inverters. However, lowering neutral current with advanced modulation techniques results in increased switching frequency and high CMV level resulting in low efficiency and high CM EMI noise magnitude. A six-phase three-level neutral point clamped inverter for capacitor voltage balancing, and common-mode voltage cancellation may be used to address the source of CMV and to tackle the trade-off relationship between CMV and performance. However, this topology has lower efficiency because of complicated switching states and a larger amount of switching devices compared to the conventional multi-level inverter. Furthermore, the problems from the neutral point connection may still exist.

In contrast with these conventional approaches, described herein is a neutral-point-less ("NPL") multi-level inverter topology with zero neutral current and active CMV cancellation capability compared to the dual three-phase inverter and the balanced six-phase inverter. This topology tackles the trade-off relationship while simultaneously maintaining the advantages of a multi-level inverter topology.

In one or more embodiments, the multi-level inverter topology described herein may eliminate the neutral point balancing issue in conventional multi-level operation by using a single capacitor instead of two split DC-link capacitors. In this single capacitor topology, the neutral points of the phase legs may be interconnected through a single bidirectional. This topology reduces the required number of switches for dual inverter operation, compared to the conventional inverter topology.

In addition to providing all the critical benefits of multi-level operation (e.g., low current total harmonic distortion, low switching loss, low common-mode electromagnetic interference noise, and low motor iron loss), the topology also offers a reduction in the DC-link capacitance up to 90% (or any other percentage) with respect to the conventional multi-level inverter topologies. Compared to the dual two-level inverter, the improved multi-level inverter design described herein, with the same capacitance, may produce 50% (or any other percentage) less stress in the capacitor current and 50% (or any other percentage) less ripple in the capacitor voltage, due to the multi-level operation without neutral point connections. The multi-level inverter topology described herein may enable the same level of ripple performance with only 46% (or any other percentage) of the capacitance required in the dual two-level topology leading to significant cost and volume reduction.

The improved multi-level inverter topology described herein may provide a number of advantages. A first advantage may include high power density and cost reductions. This advantage may rise from variable output voltage operation, smaller capacitors (no split capacitor with neutral current), reduced switch count, and/or no neutral connection to the split DC-link capacitor (Simple bus bar, layout, and capacitor design). A second advantage may include reliability improvements. This reliability increase may result from current ripple reduction for smoother torque generation, and/or reduced bearing current.

Figures 2A, 2B:
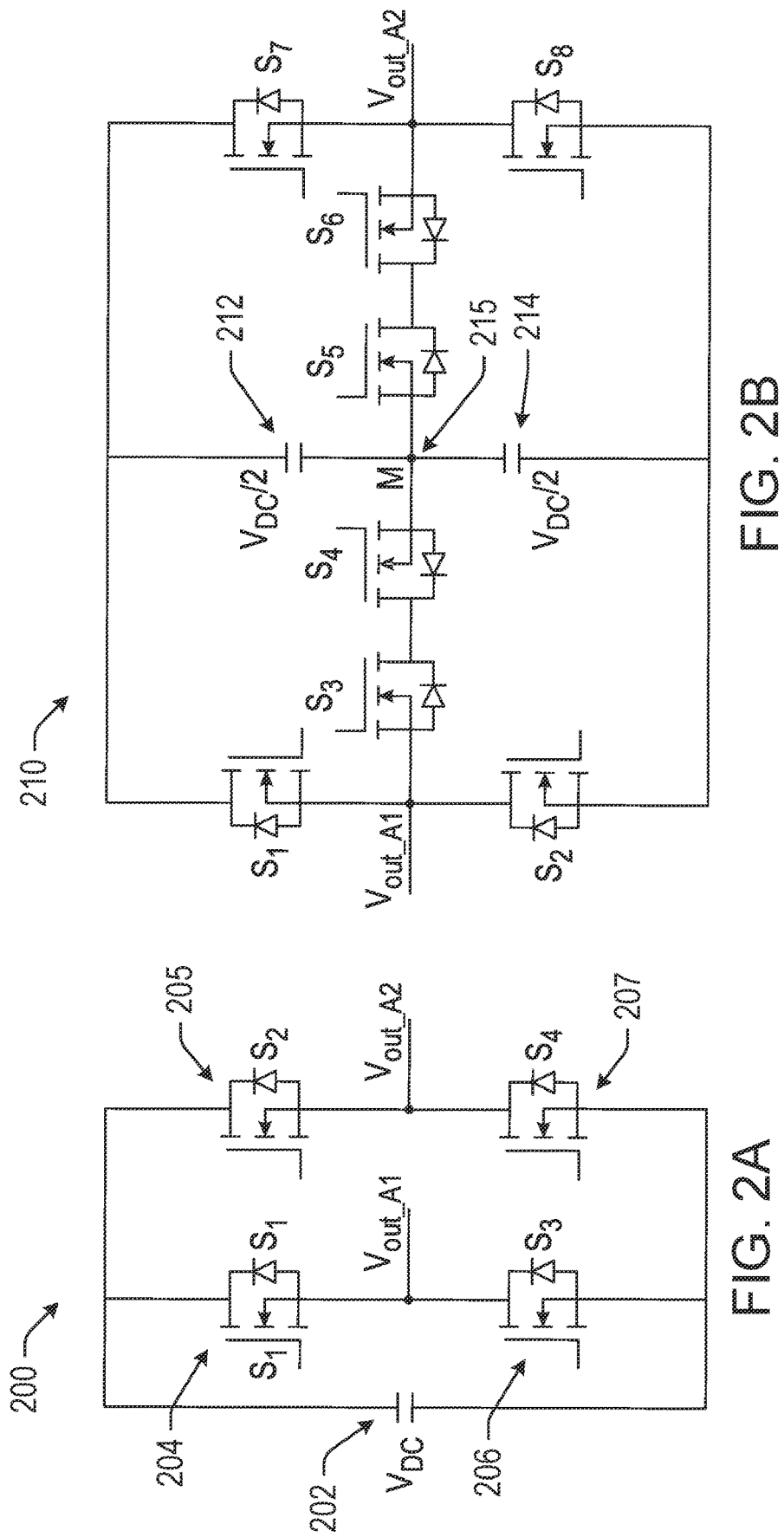
FIGS. 2A-2C illustrate example additional inverter topologies, in accordance with one or more embodiments of the disclosure.

A conventional multi-level inverter topology, such as a neutral point clamped or T-type inverter, shown in at least FIG. 2B, may provide some advantages. The conventional multi-level inverter topologies, however, may require a much higher number of switches up to three times and may have a substantially larger DC-link capacitor size, compared to the two-level inverter, due to the neutral current that eventually hinders adoption of the topology in automotive applications.

Figure 2C:
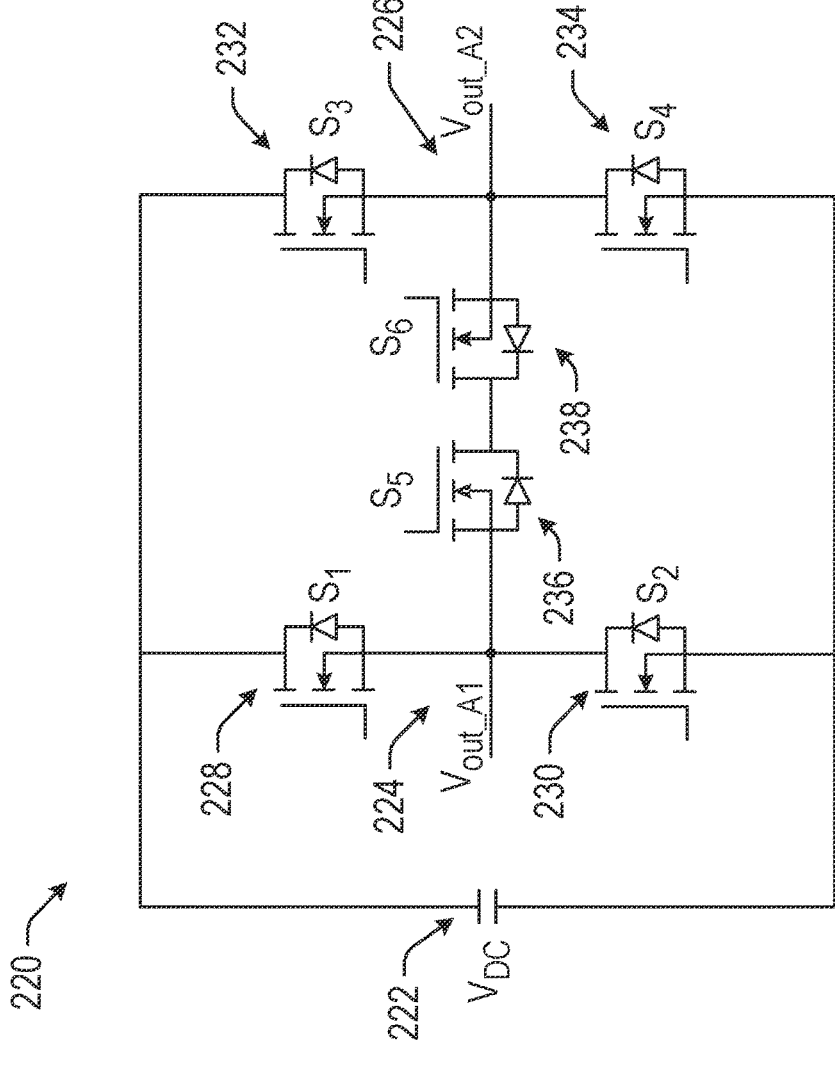

In contrast, the improved multi-level inverter topology described herein takes advantage of the benefits of a multi-level inverter topology, while simultaneously limiting the aforementioned downsides. The multi-level inverter topology described herein is a high power density (for example, 400 kW and/or any other power value) dual multi-level inverter topology with a reduced switch count and a small DC-link capacitor for heavy-duty vehicles (e.g., large SUVs, pick-up trucks, semi-trucks, etc.). The multi-level inverter topology (for example, the NPL H-type inverter shown in FIG. 2C provides the multi-level operation without a neutral point connection. With no split DC-link capacitors, the neutral point balancing issue in multi-level operation may be completely eliminated. Instead, the neutral points of the phase legs may be interconnected through a single bidirectional switch. The topology may reduce the required number of switches for dual inverter operation, compared to the dual T-type inverter shown in FIG. 2B. While providing all the critical benefits of multi-level operation (e.g., low current THD, low switching loss, low common-mode EMI noise, and low motor iron loss), the topology may also offer a reduction in the DC-link capacitance up to 90% (or any other percentage) with respect to the conventional multi-level inverter topologies.

Figure 13A:
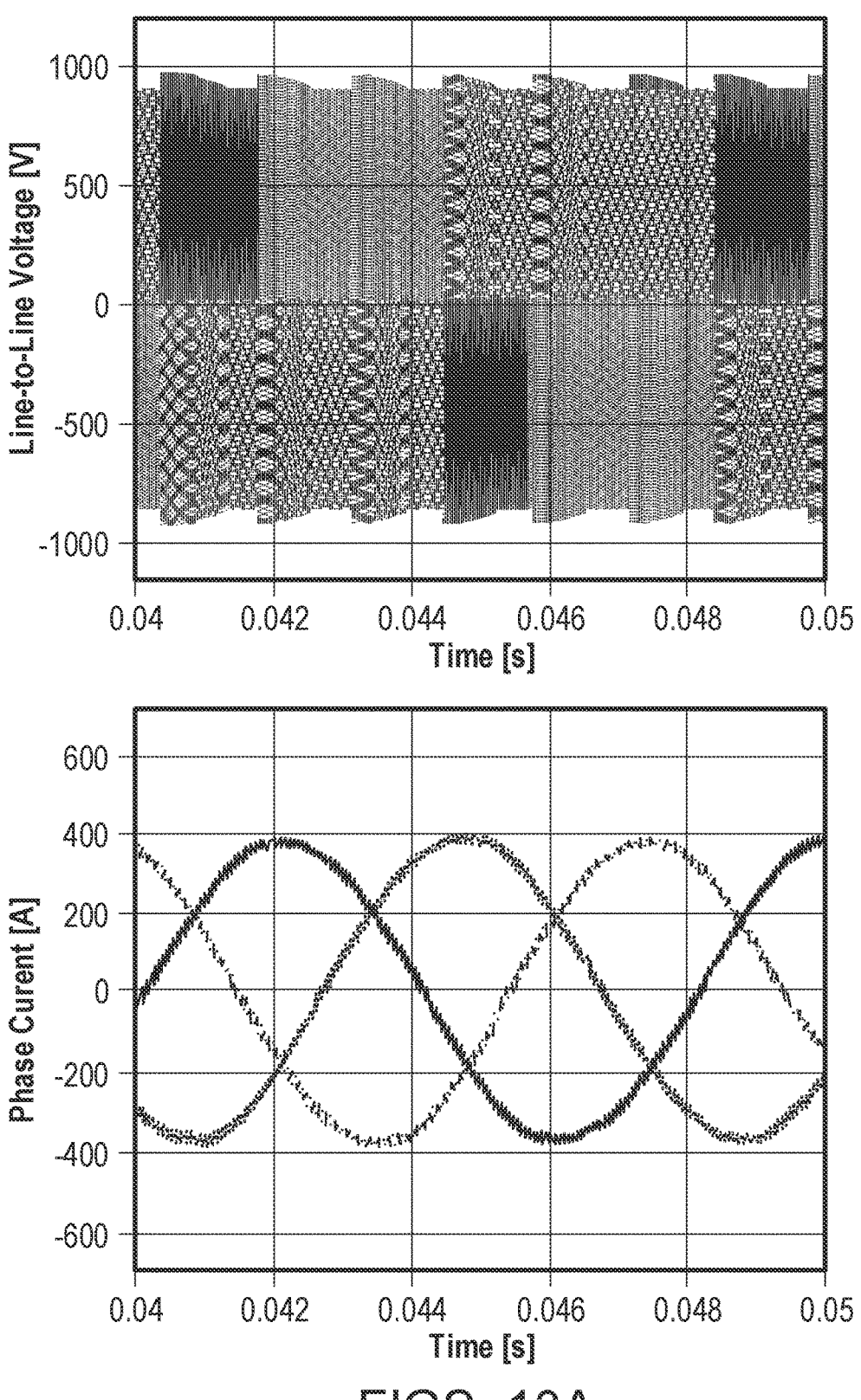
Figure 13C:
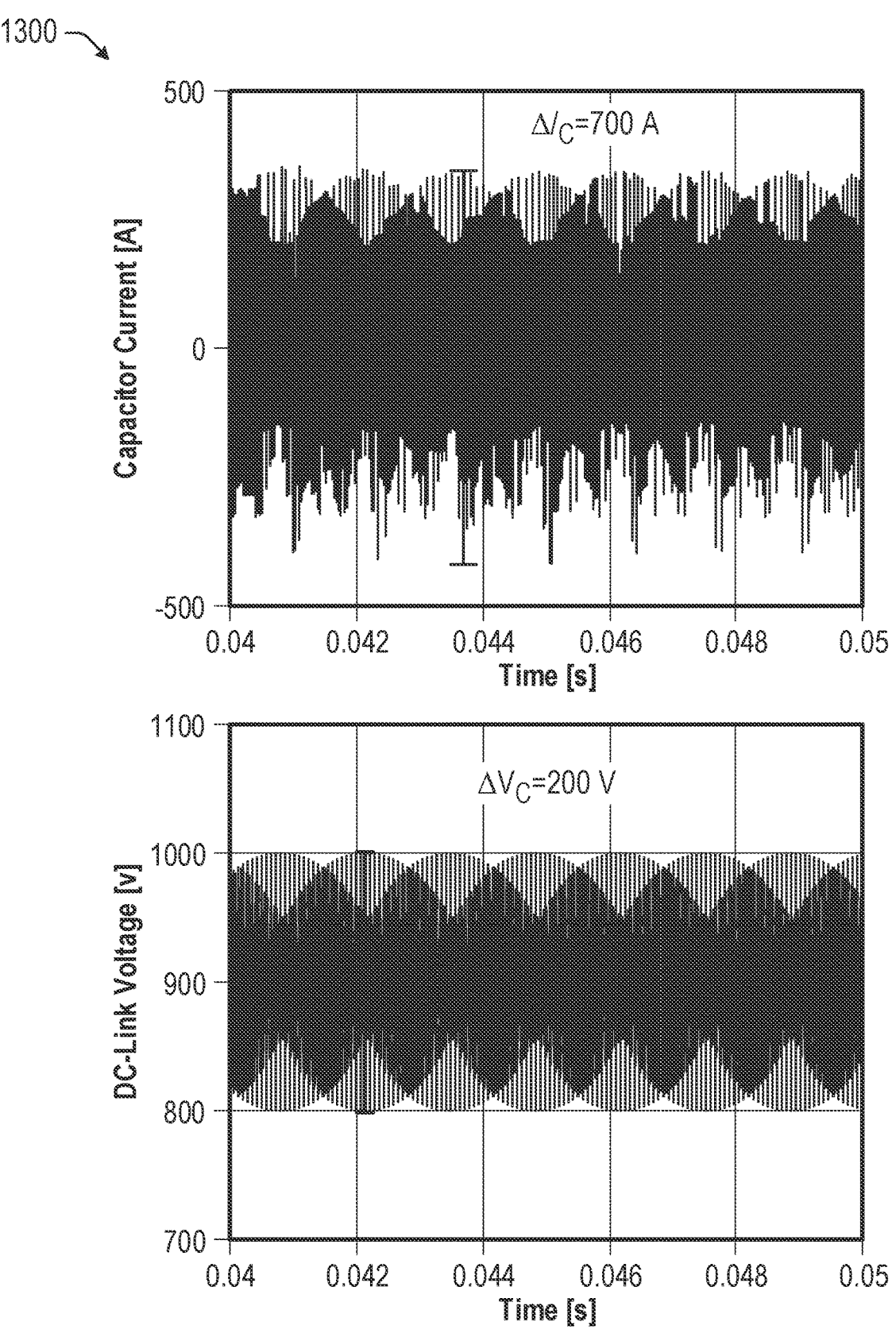
Figure 13D:
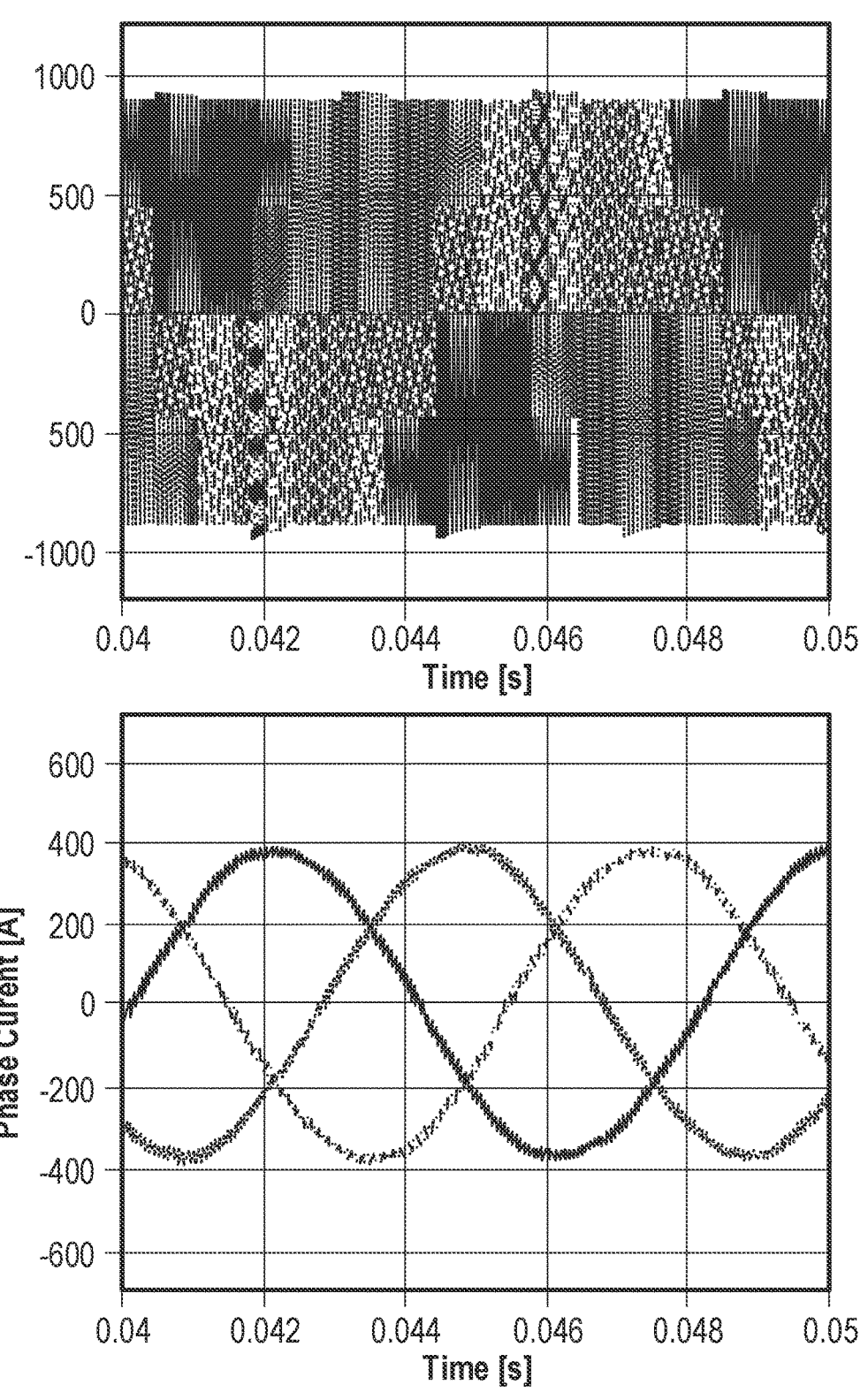
Figure 13E:
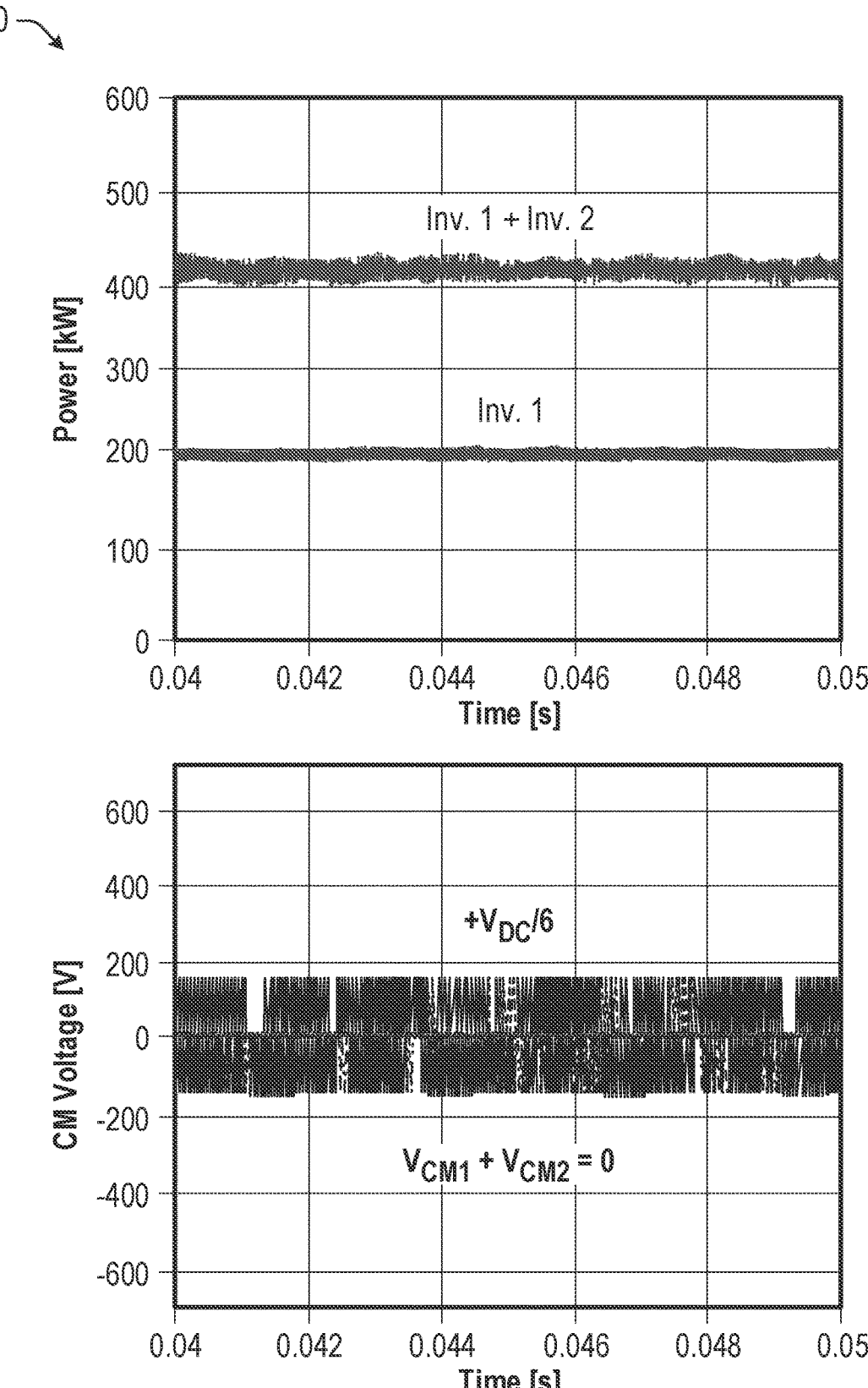
Figure 13F:
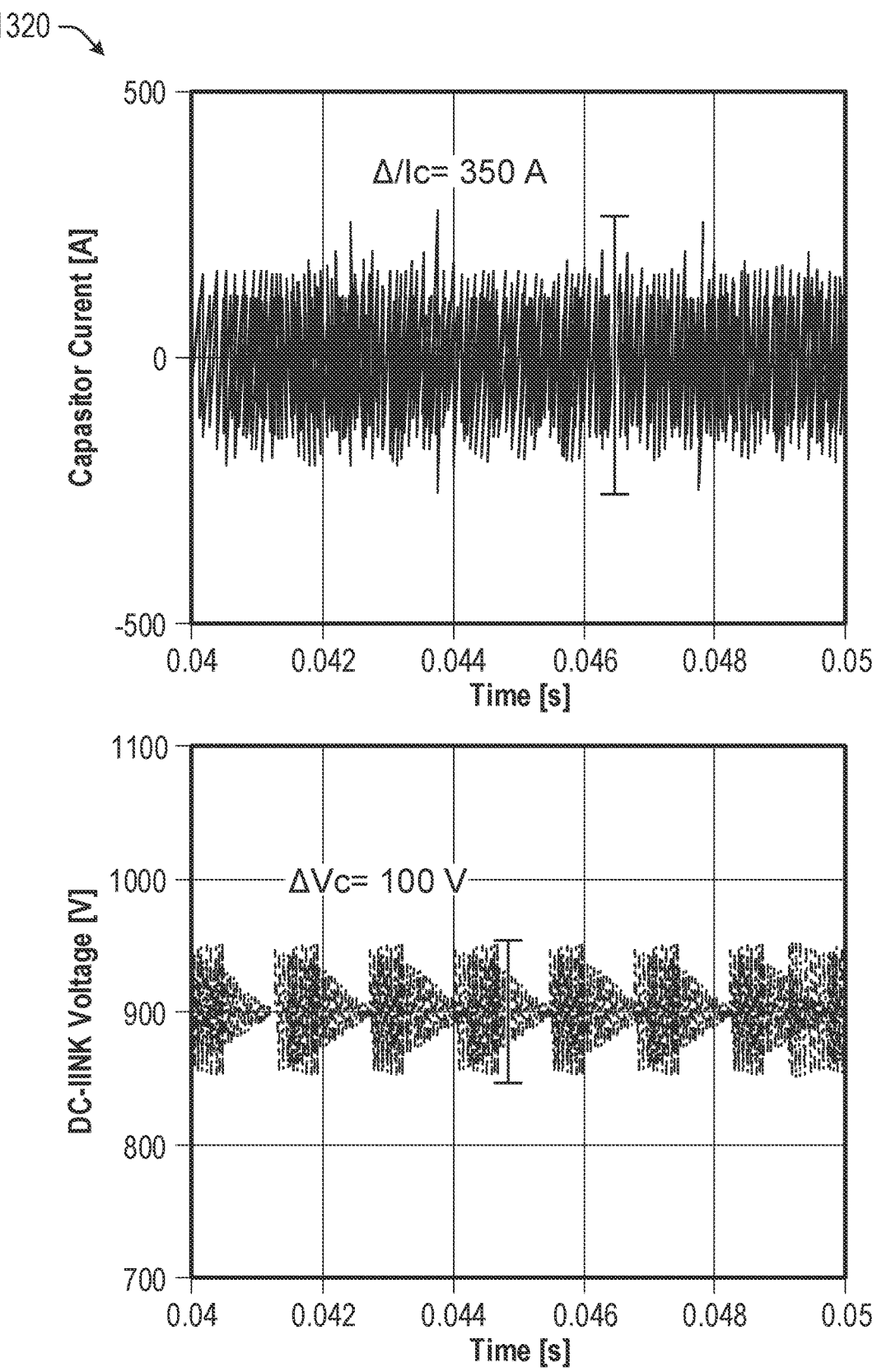

Preliminary simulation results are provided in FIGS. 13A-13F, which compare an example 400 kW dual two-level inverter in FIGS. 13A-13C and the 400 KW NPL H-type inverter in FIGS. 13D-13F The top three waveforms show the line-to-line voltage, phase current, and output power of the two inverters. The NPL H-type inverter shown in FIGS. 13D-13F shows the three-level operation with noticeably smaller ripple in phase currents. The ripple in the output power may also be reduced by 40% (or any other percentage), potentially rendering a smoother motor output torque for less vibration and improved reliability. The bottom three waveforms show the CM voltage, DC-link capacitor current, and DC-link capacitor voltage. The peak CM voltage of the NPL H-type inverter (single three-phase output) is only one-third of the two-level inverter, naturally leading to less CM EMI noise and bearing current. In addition, the total CM voltage of NPL H-type inverter (two three-phase outputs) may theoretically reach zero as two equal and opposite CM voltage waveforms cancel each other out as shown in FIG. 6B. The CM currents from two sets of inverters and windings add up in the dual two-level inverter (see FIG. 6A), but they may be canceled out in NPL H-type inverter. The CM EMI noise is expected to be lower by 20-30 dBμV, compared to the dual two-level inverter. The CM EMI filter or dv/dt filter size may be correspondingly smaller leading to a high power density inverter design. As SiC MOSFETs may be switched faster without a significant increase in the CM EMI noise, the topology may also support a higher frequency operation with a high energy efficiency.

In one or more embodiments, compared to the dual two-level inverter, the NPL H-type inverter with the same capacitance (120 uF) may produce 50% (or any other percentage) less stress in the capacitor current and 50% (or any other percentage) less ripple in the capacitor voltage, due to the multi-level operation without neutral point connections as shown in FIG. 2. The NPL H-type inverter may enable the same level of ripple performance with only 46% (or any other percentage) of the capacitance required in the dual two-level topology leading to significant cost and volume reduction.

Figures 1B, 1C, 1D:
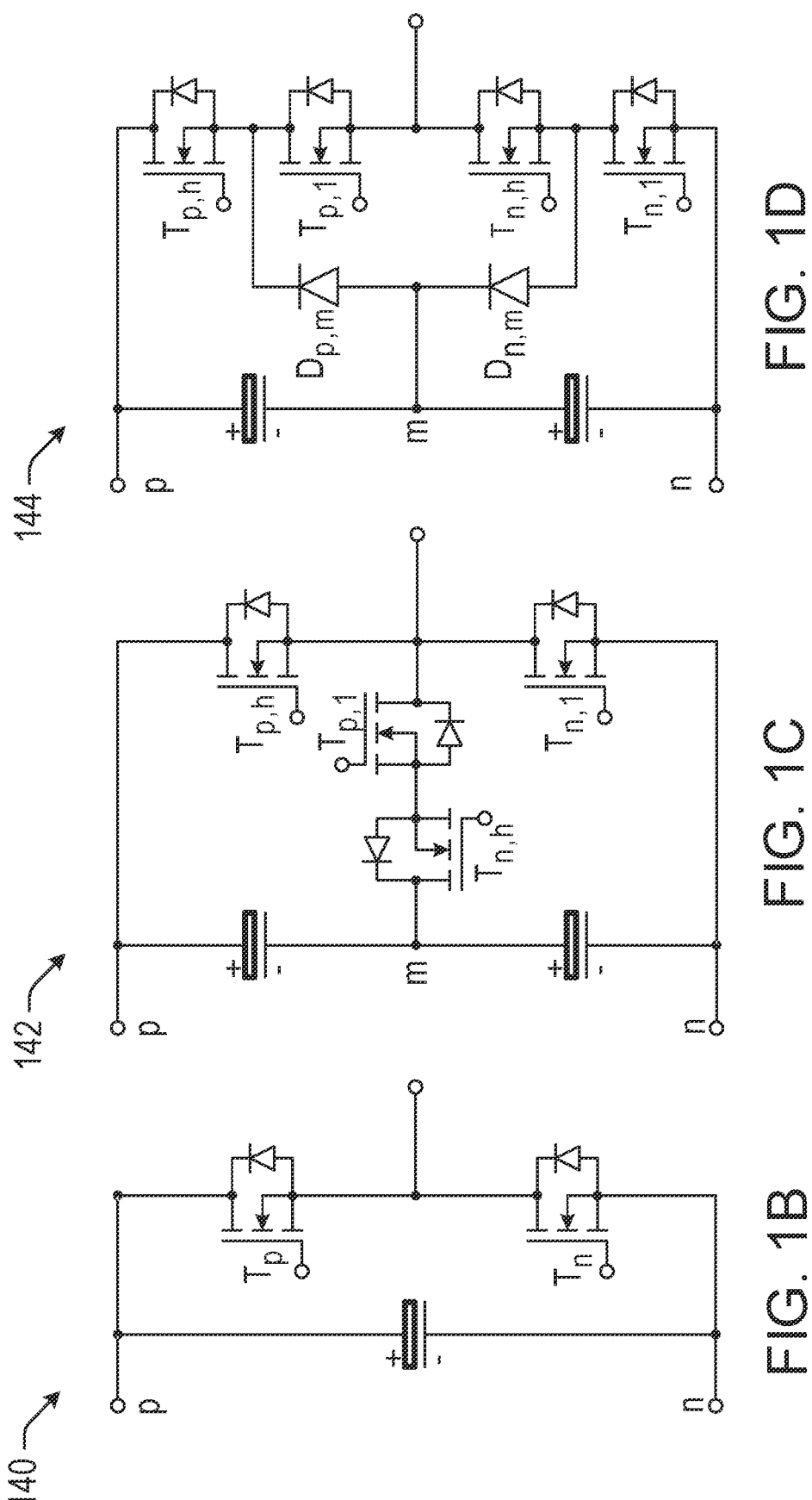

The number of required switches per phase may be increased by one in the NPL H-type inverter, but the power supply number may remain the same due to the common-drain bidirectional switch configuration shown in FIG. 1C. The increased cost due to the additional switch can be reduced by utilizing a hybrid switch configuration where four SiC MOSFETs are used for a first group of the switches and Si insulated-gate bipolar transistors (IGBTs) are used for a second set of switches. However, any other combination of different types of switches may also be used.

Figure 4:
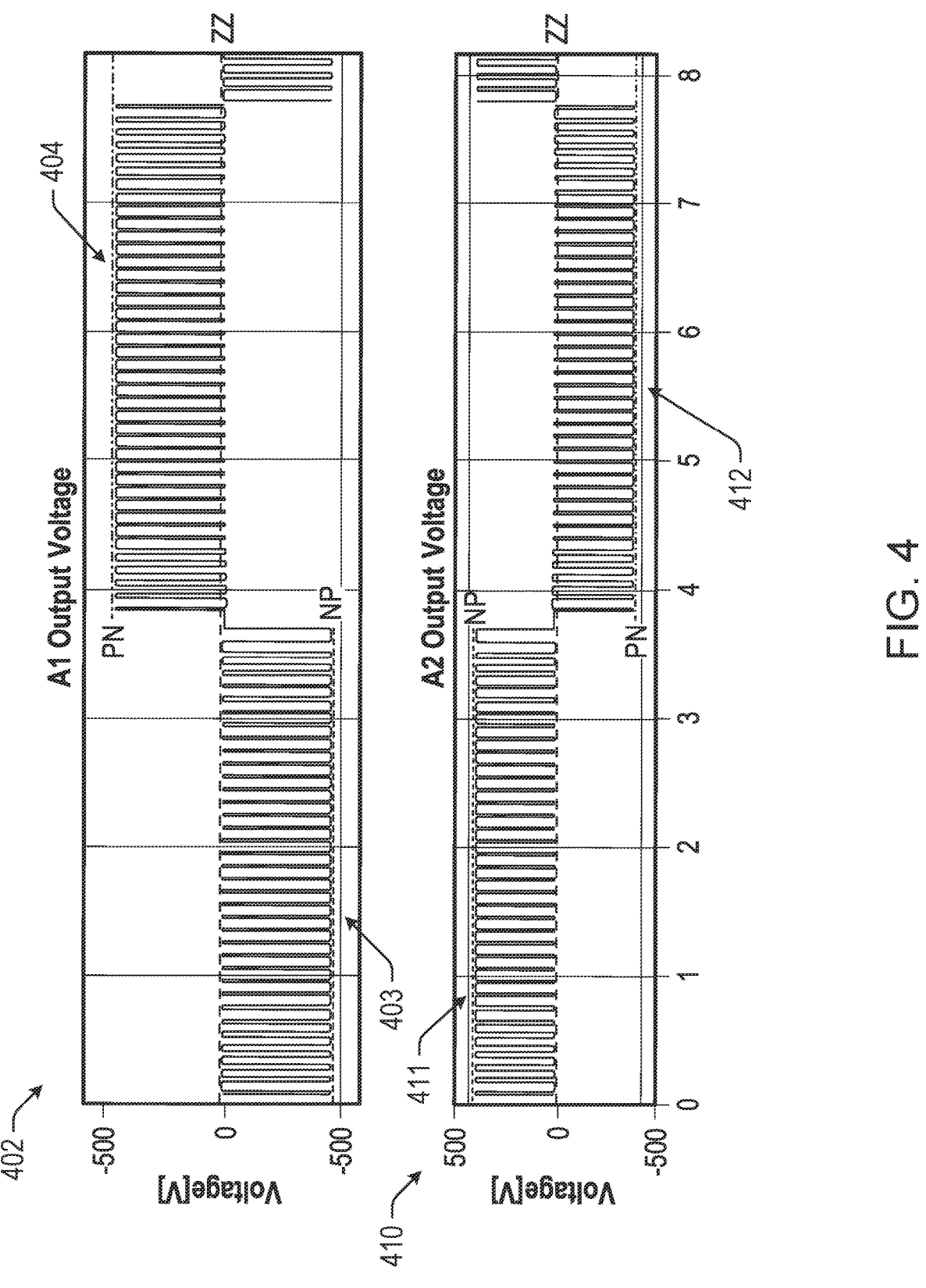
FIG. 4 illustrates example plots depicting the voltage outputs of a phase leg of an H-type single-capacitor multi-level inverter topology, in accordance with one or more embodiments of the disclosure.

The NPL H-type inverter also enables variable output voltage operation depending on an electric vehicle (EV) driving cycle, as shown in FIG. 4. For instance, in a low speed and low torque region, only small and zero vectors may be used to perform the low two-level operation (for example, 0-450 V), significantly improving the light-load or city driving efficiency. When higher output torque and speed are required, all available space vectors may be used for three-level operation. When a deep flux-weakening operation is required for highway driving, large, medium, and zero vectors may be used for high two-level operation to maximize the output current.

While reference may be made to specific percentages, power values, and/or other specific values, these are only intended to be exemplary and are not intended to be limiting in any way.

Turning to the figures, FIG. 1A illustrates an example stacked capacitor multi-level inverter topology 100, in accordance with one or more embodiments of the disclosure.

The inverter topology 100 is illustrative of a conventional multi-level inverter. The inverter topology 100 includes one or more switches (for example, a first switch 102, a second switch 104, a third switch 106, a fourth switch 108, a fifth switch 110, a sixth switch 112, a seventh switch 114, an eighth switch 116, a ninth switch 118, a tenth switch 120, an eleventh switch 122, a twelfth switch 124, a thirteenth switch 126, and/or any other number of switches). These switches may include any number of different types of switches, such as metal-oxide-semiconductor-field-effect-transistors (MOSFETs) and/or any other type of component that may be used as a switch. The inverter topology 100 is configured such that the switches may be actuated in different combinations (for example, different pairs of switches may be closed during different time periods) to produce different voltage output levels from the multi-level inverter. For example, FIG. 1A shows that the multi-level inverter produces three levels of voltage outputs, including a first voltage level output 128, a second output voltage level output 130, and a third output voltage level output 132. In this manner, the multi-level inverter is capable of converting a single-phase DC input into a three-phase AC output, with each voltage level output including a single phase of the three-phase voltage output. These three voltage level outputs are also shown as "$V_{ab}$," "$V_{bc}$," and "$V_{ca}$" in FIG. 1A. This three-phase AC output may then be provided to a load 132, such as an electric motor of a vehicle, for example (this is not intended to be limiting and the output of the inverter may also be provided to any other type of load).

The input of the multi-level inverter topology 100 also includes two capacitors (for example, a first capacitor 102 and a second capacitor 104) that are connected at a middle point 108 ("M"). Generally, one or more capacitors may be provided in parallel with the input of the inverter to minimize the effects of voltage variations as the load to which the output of the inverter is connected changes. The stacked DC-link capacitor topology shown in FIG. 1A (e.g., including two capacitors) results in a neutral current that may be three times the fundamental frequency along the middle point, leading to an undesirable capacitor voltage unbalance. This current may also continuously deviate the capacitor voltage to unacceptable levels, causing overvoltage damage to switching devices, output voltage and/or current distortion, and high voltage stress on capacitors. Further, the use of multiple capacitors may also increase the form factor size of the inverter, as additional components are required within the inverter. Various additional examples of multi-level inverter topologies including multiple capacitors are shown in FIGS. 1B-1G (for example, topologies 140-150). All of these disadvantages of the conventional stacked capacitor shown in FIGS. 1A-1G are especially undesirable in automotive and other similar applications.

Figure 5:
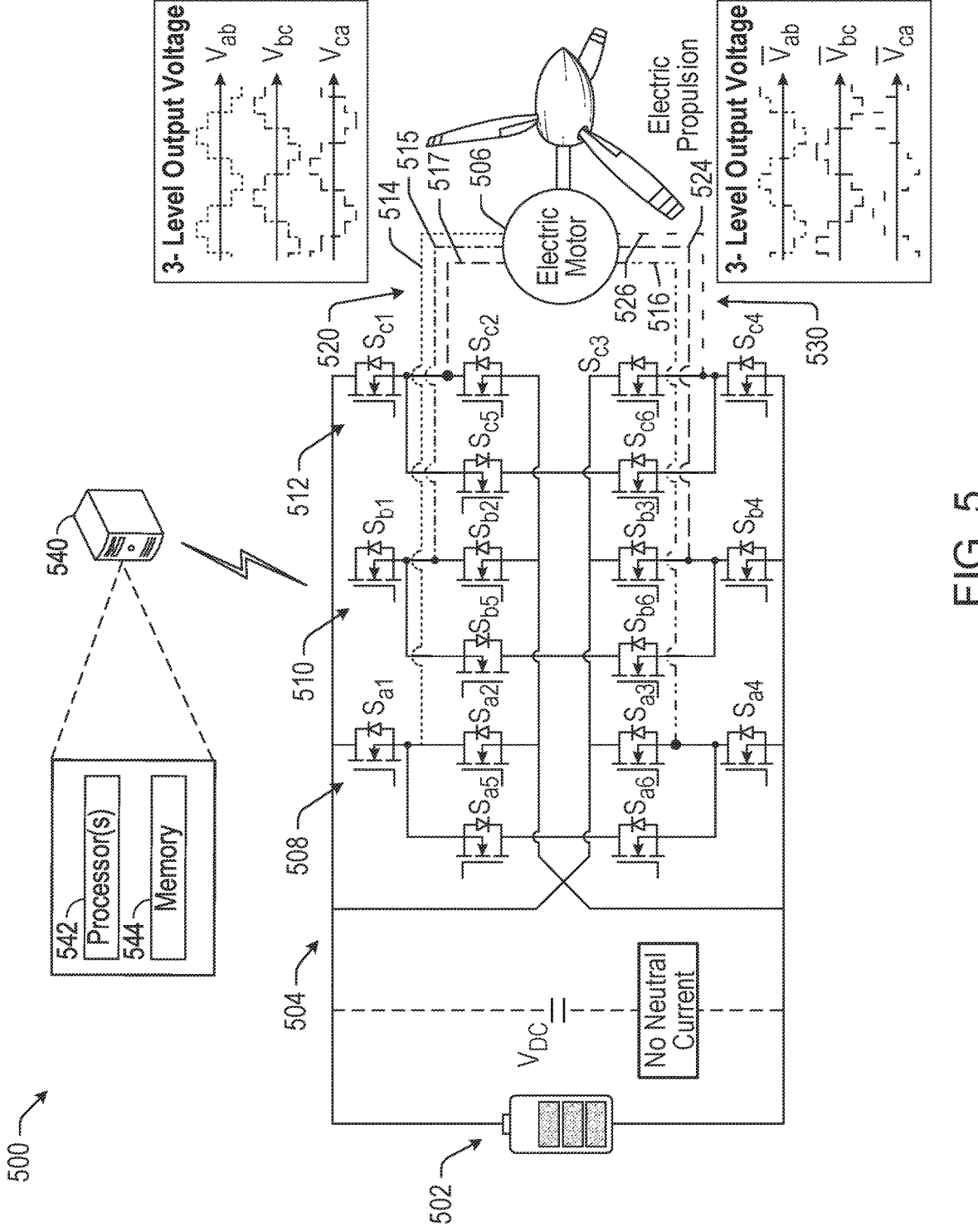
FIG. 5 illustrates an example system including an H-type single-capacitor multi-level inverter, in accordance with one or more embodiments of the disclosure.
Figure 8:
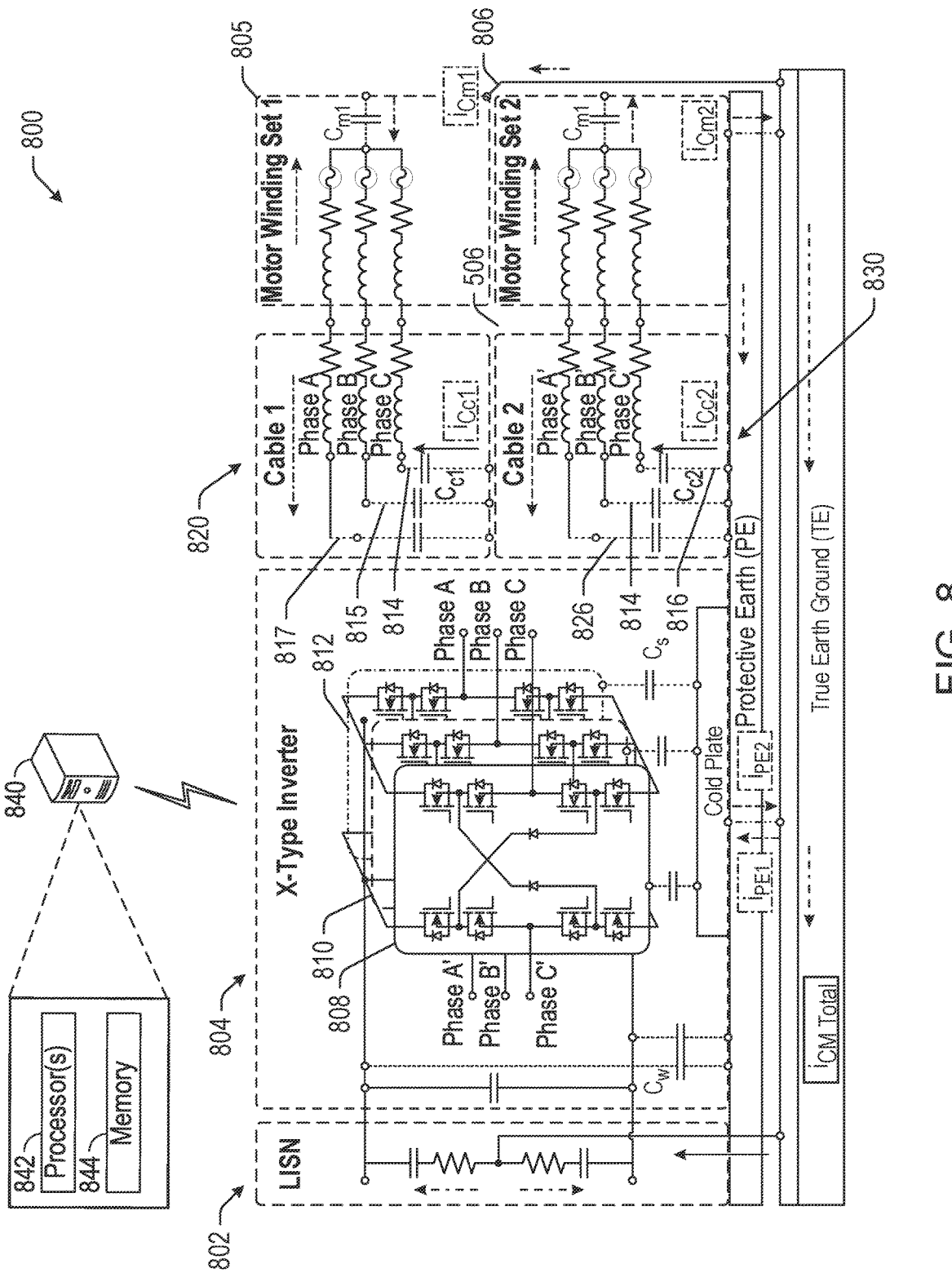
FIG. 8 illustrates an example system including an X-type single-capacitor multi-level inverter, in accordance with one or more embodiments of the disclosure.

FIGS. 2A-2C illustrate additional example inverter topologies, in accordance with one or more embodiments of the disclosure. It should be noted that the topologies shown in FIGS. 2A-2B may only illustrate a single "phase leg" of an overall inverter topology (and an inverter may include any number of such phase legs, as shown in FIGS. 5 and 8, for example) for simplicity. A "phase leg" may refer to a circuit including a combination of switches that may be used to produce one voltage output representing one voltage phase (for example, a two-level inverter produces a first non-zero voltage output and a zero voltage output) or two voltage outputs representing two voltage phases (for example, a three-level inverter products a first non-zero voltage output, a second non-zero voltage output, and a zero voltage output). Combining several of these phase legs together may produce one or more three-phase inverter outputs that may be used to provide three-phase voltage(s) to one or more loads (for example, as shown in at least FIG. 5 and FIG. 8).

FIGS. 2A-2B depict topologies associated with conventional inverters. Beginning with FIG. 2A, a first inverter topology 200 for a dual two-level voltage source inverter (VSI) is shown. Similar to the multi-level inverter described herein (shown in FIG. 2C), the first inverter topology 200 may only include a single capacitor 202. However, the first inverter topology 200 may only include four switches (for example, switch 204, switch 205, switch 206, and switch 207) and may only be configured to produce two voltage level outputs (for example, a first non-zero voltage output and a zero voltage output).

FIG. 2B illustrates a second inverter topology 210, which may include a three-level T-type inverter. The topology 210 includes a split capacitor design (for example, a first capacitor 212 and a second capacitor 214), similar to the split capacitor design shown in FIG. 1A, which uses a middle point 215 to create the different voltage level outputs. This topology 210 may be beneficial in that it reduces losses, improves quality, and reduces EMI. However, the topology 210 may be problematic given the increase in the form factor of the inventor from the added capacitor and increased number of switches.

Finally, FIG. 2C illustrates a third inverter topology 220 illustrating a phase leg of a single capacitor multi-level inverter as described herein. Specifically, the third inverter topology 220 may show a phase leg for a three-level "H-type" inverter (this H-type topology is further illustrated and described in at least FIGS. 3A-3D, FIG. 4, and FIG. 5). The third inverter topology has the advantages of allowing for three voltage levels to be produced (for example, a first non-zero voltage level, a second non-zero voltage level, and a zero voltage) while maintaining a smaller form factor by only requiring a single capacitor (for example, capacitor 222) at the input of the inverter. For example, the first non-zero voltage level may be provided at the first output 224 and the second non-zero voltage level may be provided at the second output 226. These two non-zero voltage levels may have the same amplitude but may be phase-shifted. Thus, combinations of these phase legs may be used to produce multi-phase voltage outputs that may be provided to one or load(s).

The high and low voltage levels in topology 220 may be identically generated as in topology 200 and topology 210. To provide the high voltage level for a first output 224 (i.e., $+V_{DC}/2$), the first switch 228 may be switched on (e.g., closed) and the second switch 230 may be switched off (e.g., opened). For the low voltage level for the first output 224 (i.e., $-V_{DC}/2$), the first switch 228 may be switched off and the second switch 230 may be turned on. The other leg may be complementarily operated. Finally, while providing these high and low voltage levels for the first output 224 and the second output 226, the fifth switch 236 and the sixth switch 238 may be turned off and not engaged.

The mid-level in the third inverter topology 220 may be generated by opening the first switch 228, the second switch 230, the third switch 232, and the fourth switch 234 and closing the fifth switch 236 and the sixth switch 238, forcing the "zero" potential difference between the two inverter outputs. This mid-level may not rely on the voltage potential of the split DC-link capacitors unlike conventional three-level inverters (for example, shown in the second inverter topology 210). As the current in and out of the midpoint (e.g., neutral point) may be eliminated from topology 220, the expected ripple may be further reduced with only a quarter of the required DC-link capacitance of topology 210.

FIGS. 3A-3D illustrate an example operation of a phase leg 300 of an H-type single-capacitor multi-level inverter topology, in accordance with one or more embodiments of the disclosure. Particularly, FIGS. 3A-3D illustrate a manner in which the different switches (for example, first switch 302, second switch 303, third switch 304, fourth switch 305, fifth switch 306, and six switch 307) included in a phase leg of an H-type single-capacitor multi-level inverter may be actuated (for example, closed and/or opened) to produce the three separate voltage levels output by the multi-level inverter. In one or more embodiments, the different switches may be opened and/or closed based on signals received from a controller (for example, controller 540 shown in FIG. 5, controller 840 shown in FIG. 8, computing system 2100, and/or any other controller described herein) associated with the inverter. However, the switches may also be caused to open and/or close using any other suitable mechanism as well.

Figures 3A, 3B, 3C, 3D:
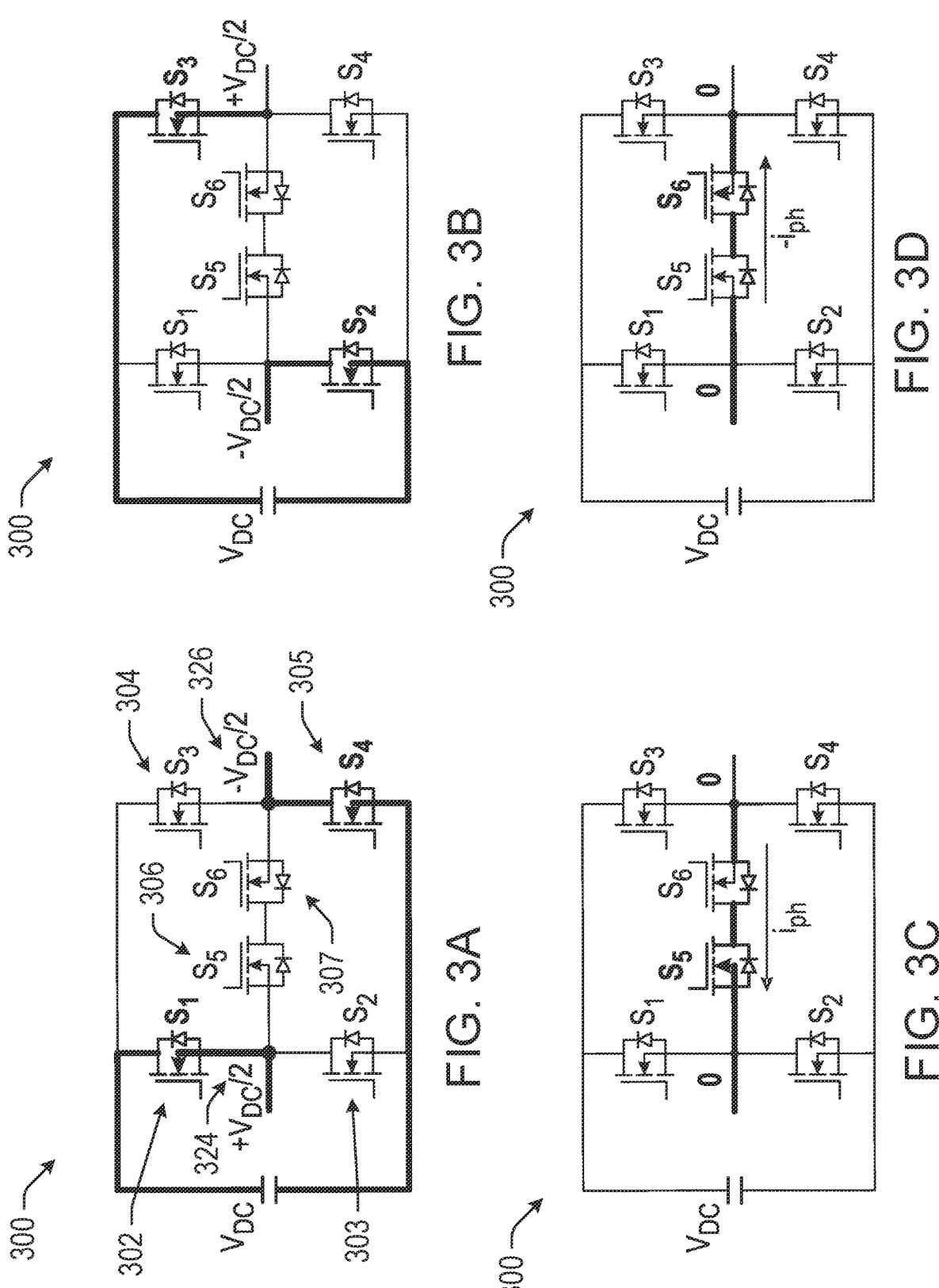
FIGS. 3A-3D illustrate an example operation of a phase leg of an H-type single-capacitor multi-level inverter topology, in accordance with one or more embodiments of the disclosure.

FIG. 3A shows a first configuration of the phase leg 300 in which the first switch 302 and the fourth switch 305 are closed while the remaining switches (for example, the second switch 303, third switch 304, and sixth switch 306) are open. This results in a first output voltage level being produced by the inverter. The first output voltage level may include a waveform that alternates between a positive voltage level (for example, equivalent to $V_{DC}/2$ or any other voltage value) and a negative voltage level (for example, equivalent to $-V_{DC}/2$ or any other voltage value), for example. FIG. 3B shows a second configuration in which the second switch 303 and the third switch 304 are closed and the remaining switches are open. This results in a second output voltage level to be produced by the inverter. The second output voltage level may include a waveform that alternates between a negative voltage level (for example, equivalent to $-V_{DC}/2$ or any other voltage value) and a positive voltage level (for example, equivalent to $V_{DC}/2$ or any other voltage value), for example. Thus, the first output voltage waveform and the second output voltage waveform may include similar amplitudes but are phase shifted with respect to one another (this is illustrated in FIG. 4). Finally, FIGS. 3C-3D show third and fourth configurations in which a zero voltage is output. This may be accomplished by either closing one or both of the fifth switch 305 and the sixth switch 306 and opening the remaining switches. Thus, the operations of the switches in this manner may allow for two different voltage phase outputs to be produced. As one non-limiting example, FIG. 5 shows a first phase leg 508 outputting a first phase output 514 and a second phase output 516.

FIG. 4 illustrates example plots depicting the voltage outputs of a phase leg of an H-type single-capacitor multi-level inverter topology, in accordance with one or more embodiments of the disclosure.

FIG. 4 shows two plots including a first plot 402 and a second plot 410. The first plot 402 shows the voltage waveform associated with a first output of the phase leg (for example, the first output 324 shown in FIGS. 3A-3D). The second plot 410 shows the voltage waveform associated with a second output of the phase leg (for example, the second output 326 shown in FIGS. 3A-3D). That is, the plots depict changes in the voltages at the first output and second output over time.

As shown in FIGS. 3A-3D the sign of the first output 324 and the second output 326 may differ depending on the specific combination of switches that are closed. For example, when the first switch 302 and the fourth switch 305 are closed as shown in FIG. 3A, the value of the voltage produced at the first output is positive and the value of the voltage produced at the second output is negative. However, when the second switch 303 and the third switch 304 are closed as shown in FIG. 3B, the value of the voltage produced at the first output is negative and the value of the voltage produced at the second output is positive.

Closing different combinations of switches at different times produces different voltage waveform output shapes. Beginning with the first plot 402 showing the voltage of the first output, a first portion 403 of the voltage is shown as being a negative voltage. However, the voltage waveform then transitions to a positive voltage in the second portion 404. This may be caused by switching from the configuration shown in FIG. 3B, which produces a negative voltage at the first output, to the configuration shown in FIG. 3A, which produces a positive voltage at the first output. Switching between these configurations in this manner may also cause the voltage of the second output to transition from a positive voltage (shown in a first portion 411 of the plot 410) to a negative voltage (shown in a second portion 412 of the plot 410). As is illustrated through these two plots, the phase leg may be used to produce two voltage waveform outputs that are phase shifted with respect to one another.

FIG. 5 illustrates an example system 500 including an H-type single-capacitor multi-level inverter, in accordance with one or more embodiments of the disclosure. The system 500 may include at least a power source 502, an inverter 504, and one or more loads 506.

The inverter 504 is a multi-level inverter topology that includes multiple H-type phase legs to generate two different three-phase outputs. For example, the inverter 504 may include a first H-type phase leg 508, a second H-type phase leg 510, and a third H-type phase leg 512. The first H-type phase leg 508 may produce a first output 514 associated with a first three-phase output 520. The first H-type phase leg may also produce a second output 516 associated with a second three-phase output 530. The second H-type phase leg 510 may produce a third output 515 associated with the first three-phase output 520. The second H-type phase leg 510 may also produce a fourth output 524 associated with a second three-phase output 530. The third H-type phase leg 512 may produce a fifth output 517 associated with the first three-phase output 520. The third H-type phase leg may also produce a sixth output 526 associated with the second three-phase output 530. In this manner, the inverter may produce two three-phase voltage outputs that are provided to the load 506 (for example, the first three-phase output 520 and the second three-phase output 530). This is merely one example of a multi-level inverter topology that uses a single capacitor and any other topology may be similarly used as well.

The inverter may also include a controller 540. The controller 540 may be a local or remote system (for example, a microcontroller, a remote server, or other any other type of device or system capable of performing computing functions) that may be used to facilitate any of the functionality of the inverter 504 (and/or any other inverter described herein). For example, the controller 540 may provide signals to the inverter 504 to actuate the various switches in the inverter 504. The controller 540 may also be configured to perform any other functions described herein. The computing system may also include one or more processors 542 and memory 544, as well as any other elements described as included within the computing system 2100.

FIGS. 6A-6B illustrate operation of a phase leg 600 of an X-type single-capacitor multi-level inverter topology, in accordance with one or more embodiments of the disclosure. The X-type topology may be an alternative to the H-type topology shown in FIGS. 3A-3D. An inverter with an X-type topology may function in a similar manner as an inverter with the H-type topology, but may be more suitable for higher voltage applications. The X-type topology may include a greater number of switches than the H-type topology while also maintaining the single capacitor (e.g., stacked capacitors are not required in this X-type topology as well).

Similar to FIGS. 3A-3D, FIGS. 6A-6D illustrate a manner in which the different switches (for example, first switch 602, second switch 603, third switch 604, fourth switch 605, fifth switch 606, and six switch 607, seventh switch 608, eighth switch 609, ninth switch 610, and tenth switch 611) included in a phase leg of an X-type single-capacitor multi-level inverter may be actuated (for example, closed and/or opened) to produce the three separate voltage levels output by the multi-level inverter. FIGS. 6A-6D show the ninth switch 610 and the tenth switch 611 as being diodes. However, this is not intended to be limiting and the ninth switch 610 and tenth switch 611 may also be similar types of switches as the first switch 602, second switch 603, third switch 604, fourth switch 605, fifth switch 606, and six switch 607, seventh switch 608, and eighth switch 609 as well.

In one or more embodiments, the different switches may also be opened and/or closed based on signals received from a controller (for example, controller 540 shown in FIG. 5, controller 840 shown in FIG. 8, and/or any other controller described herein) associated with the inverter. However, the switches may also be caused to open and/or close using any other suitable mechanism as well. The phase leg 600 may also include a first output 624 and a second output 626.

Figure 7:
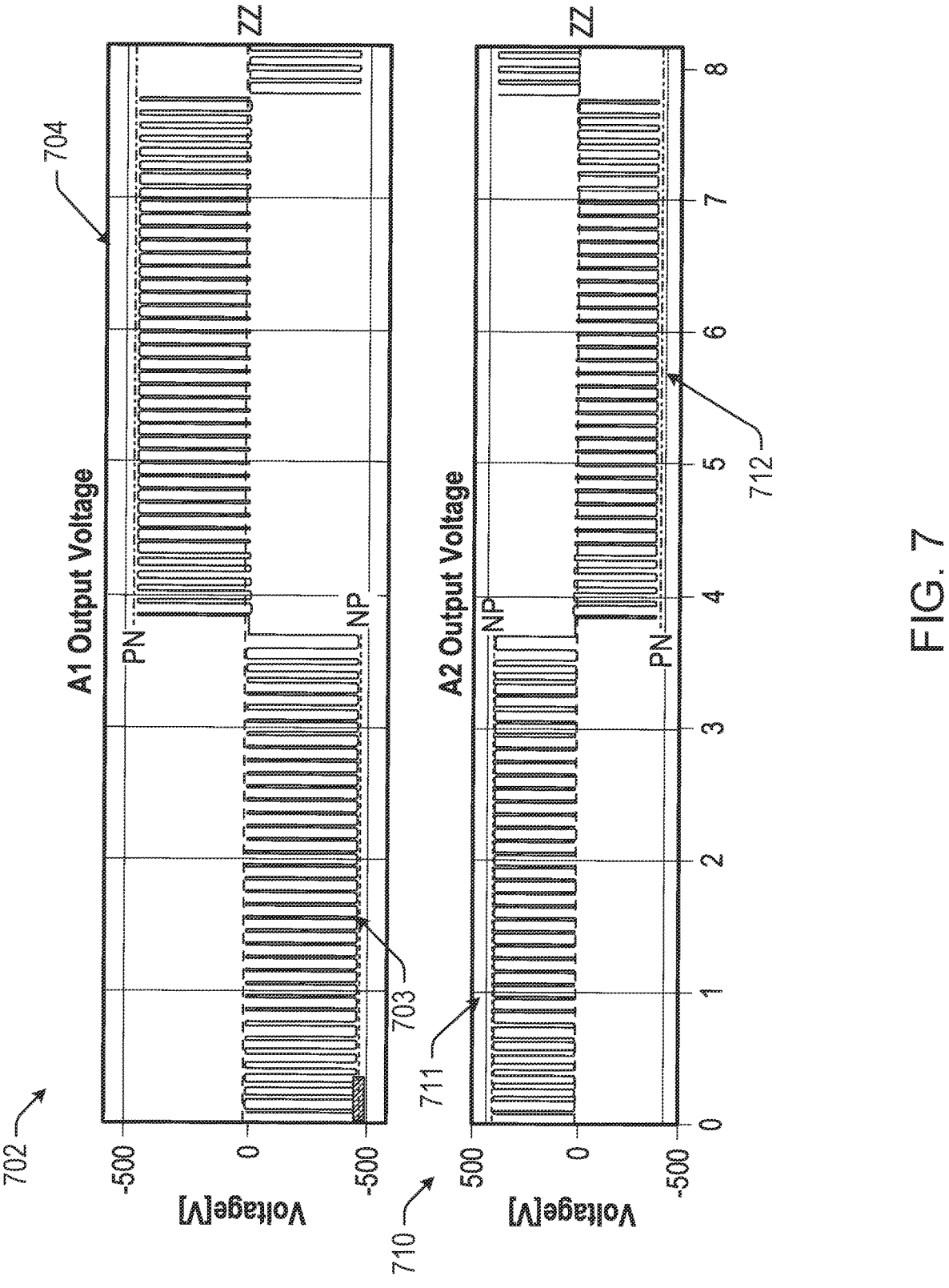
FIG. 7 illustrates example output voltage plots associated with a phase leg of an X-type single-capacitor multi-level inverter topology, in accordance with one or more embodiments of the disclosure.

FIG. 6A shows a first configuration of the phase leg 600 in which the third switch 604, fourth switch 605, fifth switch 606, and sixth switch 607 are closed while the remaining switches are open. This results in a first output voltage level being produced by the inverter. The first output voltage level may include a waveform that alternates between a positive voltage level and a negative voltage level. FIG. 6B shows a second configuration in which the second switch 603, the seventh switch 607, and the tenth switch 611 are closed and the remaining switches are open. This results in a second output voltage level to be produced by the inverter. The second output voltage level may be a zero voltage, for example. FIG. 6C shows a third configuration in which the third switch 604, the sixth switch 606, and the ninth switch 610 are closed and the remaining switches are open. This may also result in a zero voltage output. Finally, FIG. 6D shows a fourth configuration in which the first switch 602, second switch 603, sixth switch 606, and seventh switch 607 are closed and the remaining switches are open. This may result in a third output voltage level being produced by the inverter. The first output voltage waveform and the third output voltage waveform may include similar amplitudes but are phase shifted with respect to one another (this is illustrated in FIG. 7). It should be noted that the different combinations of switches that are shown and described as being opened and closed in FIGS. 6A-6D are merely exemplary and not intended to be limiting.

FIG. 7 illustrates example output voltage plots associated with a phase leg (for example, as shown in FIGS. 6A-6D) of an X-type single-capacitor multi-level inverter topology, in accordance with one or more embodiments of the disclosure. The plots may be similar to the plots shown in FIG. 4.

FIG. 7 shows two plots including a first plot 702 and a second plot 710. The first plot 702 shows the voltage waveform associated with a first output of the phase leg (for example, the first output 624 shown in FIGS. 6A-6D). The second plot 710 shows the voltage waveform associated with a second output of the phase leg (for example, the second output 626 shown in FIGS. 6A-6D). That is, the plots depict changes in the voltages at the first output and second output over time.

As shown in FIGS. 6A-6D the sign of the first output 624 and the second output 626 may differ depending on the specific combination of switches that are closed. For example, when the first switch third switch 604, the fourth switch 605, the fifth switch 606, and the sixth switch 606 are closed as shown in FIG. 6A, the value of the voltage produced at the first output 624 is positive and the value of the voltage produced at the second output 626 is negative.

Closing different combinations of switches at different times produces different voltage waveform output shapes. Beginning with the first plot 702 showing the voltage of the first output, a first portion 703 of the voltage is shown as being a negative voltage. However, the voltage waveform then transitions to a positive voltage in the second portion 704. This may be caused by switching from the configuration shown in FIG. 6B, which produces a negative voltage at the first output, to the configuration shown in FIG. 6A, which produces a positive voltage at the first output. Switching between these configurations in this manner may also cause the voltage of the second output to transition from a positive voltage (shown in a first portion 711 of the plot 710) to a negative voltage (shown in a second portion 712 of the plot 710). As is illustrated through these two plots, the phase leg may be used to produce two voltage waveform outputs that are phase shifted with respect to one another.

It should be noted that the waveforms shown in the plots of FIGS. 4 and 7 are merely illustrative and any other waveforms may be produced by closing and/or opening different combinations of switches included in the inverter. Additionally, although the waveforms presented in FIGS. 4 and 7 are shown as square waves, these waveforms may also be modulated to produce sinusoidal waveforms as well.

FIG. 8 illustrates an example system 800 including an X-type single-capacitor multi-level inverter, in accordance with one or more embodiments of the disclosure. The system 800 may be similar to the system 500, but may include X-type phase legs (for example, the first phase leg 808, the second phase leg 810, and the third phase leg 812) rather than the H-type phase legs of FIG. 5. The system 800 may include at least a power source 802, an inverter 804, and one or more loads (for example, first load 805 and second load 806). Although FIG. 5 shows a single load 506 and FIG. 8 shows a first load 805 and a second load 806, this is merely illustrative and is not intended to be limiting.

The inverter 804 may be a multi-level inverter topology that includes multiple X-type phase legs to generate two different three-phase outputs. For example, the inverter 804 may include a first X-type phase leg 808, a second X-type phase leg 810, and a third X-type phase leg 812. The first X-type phase leg 808 may produce a first output 814 associated with a first three-phase output 520. The first X-type phase leg may also produce a second output 816 associated with a second three-phase output 530. The second X-type phase leg 810 may produce a third output 815 associated with the first three-phase output 820. The second X-type phase leg 810 may also produce a fourth output 824 associated with a second three-phase output 830. The third X-type phase leg 812 may produce a fifth output 817 associated with the first three-phase output 820. The third X-type phase leg 812 may also produce a sixth output 826 associated with the second three-phase output 830. In this manner, the inverter produces two three-phase voltage outputs that are provided to the load 806 (for example, the first three-phase output 820 and the second three-phase output 830). This is merely one example of a multi-level inverter topology that uses a single capacitor and any other topology may be similarly used as well.

The inverter may also include a controller 840. Similar to the controller 840, the controller 840 may be a local or remote system (for example, a microcontroller, a remote server, or other any other type of device or system capable of performing computing functions) that may be used to facilitate any of the functionality of the inverter 804 (and/or any other inverter described herein). For example, the controller 840 may provide signals to the inverter 804 to actuate the various switches in the inverter 804. The controller 840 may also be configured to perform any other functions described herein. The computing system may also include one or more processors 842 and memory 844, as well as any other elements described as included within the computing system 2100.

Figures 9A, 9B:
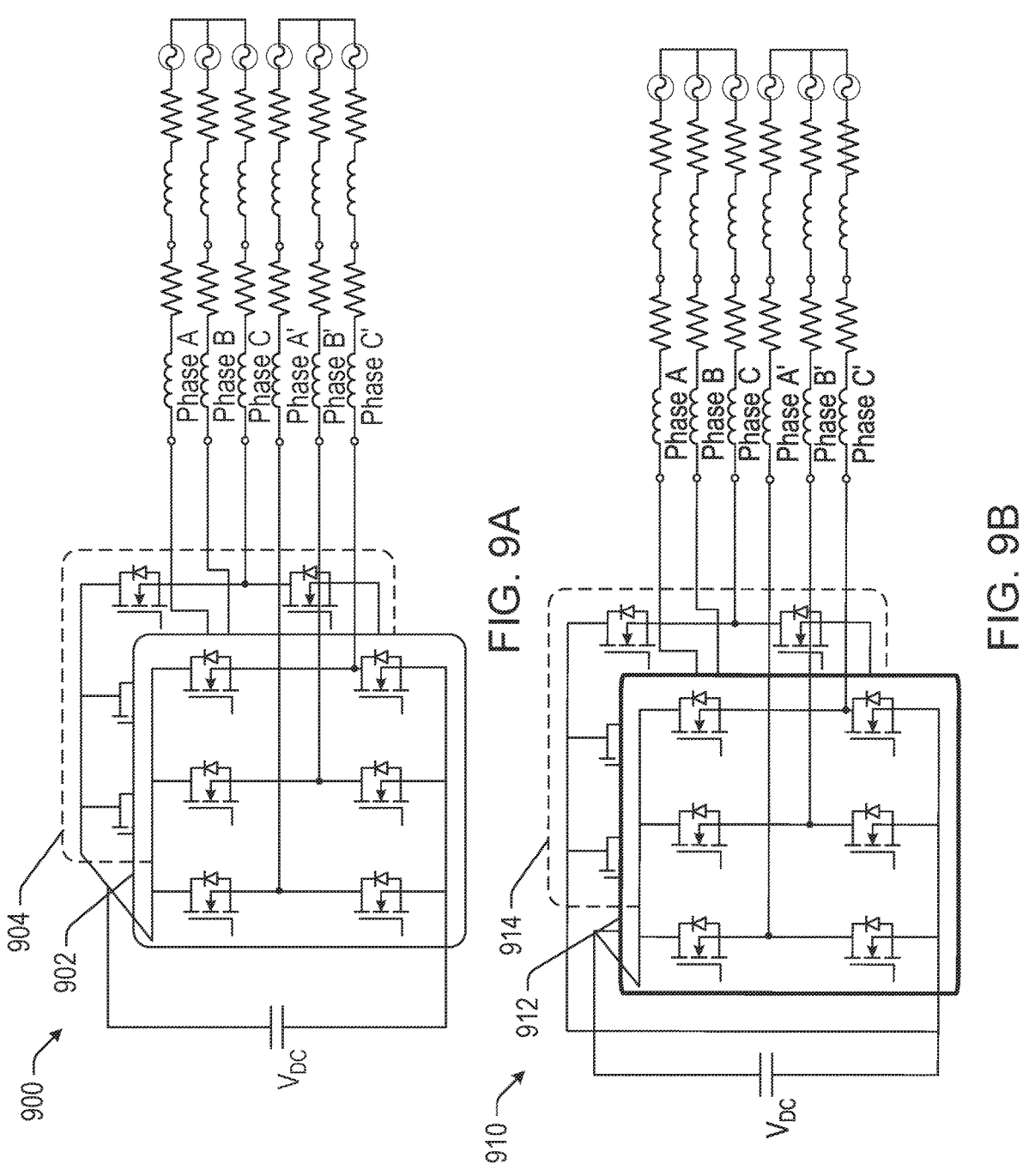
FIGS. 9A-9C illustrate additional example inverter topologies, in accordance with one or more embodiments of the disclosure.

FIGS. 9A-9B provide further illustrations of conventional inverter topologies. Beginning with FIG. 9A, a dual three-phase inverter topology 900 is shown, in accordance with one or more embodiments of the disclosure. The dual three-phase inverter topology 900 includes two bundles of three-phase legs (for example, a first three-phase leg 902 and a second three-phase leg 904), each of which may include a series connection of two semiconductor switches. The output voltages of each phase leg with respect to the ground may continuously be switched between a first voltage and a second voltage (for example, between $\pm V_{DC}/2$ or any other voltage values) during normal operation. That is, the phase legs may output PWM signals. This results in CMVs generated by the inverter being $V_{CM1}=(V_{ag}+V_{bg}+V_{cg})/3$ and $V_{CM2}=(V_{a'g}+V_{b'g}+V_{c'g})/3$. The CMV waveforms of the dual three-phase inverter in one switching cycle is presented in FIG. 10. Given that both CMVs may have the same magnitude level, the total CMV is two times the value of $V_{CM1}$. Since the total CMV induces leakage current through the common-mode path and couples to the machine and leads to bearing current in electric propulsion applications, the high level of the total CMV has an adverse impact on the CM EMI noise magnitude.

Figure 10:
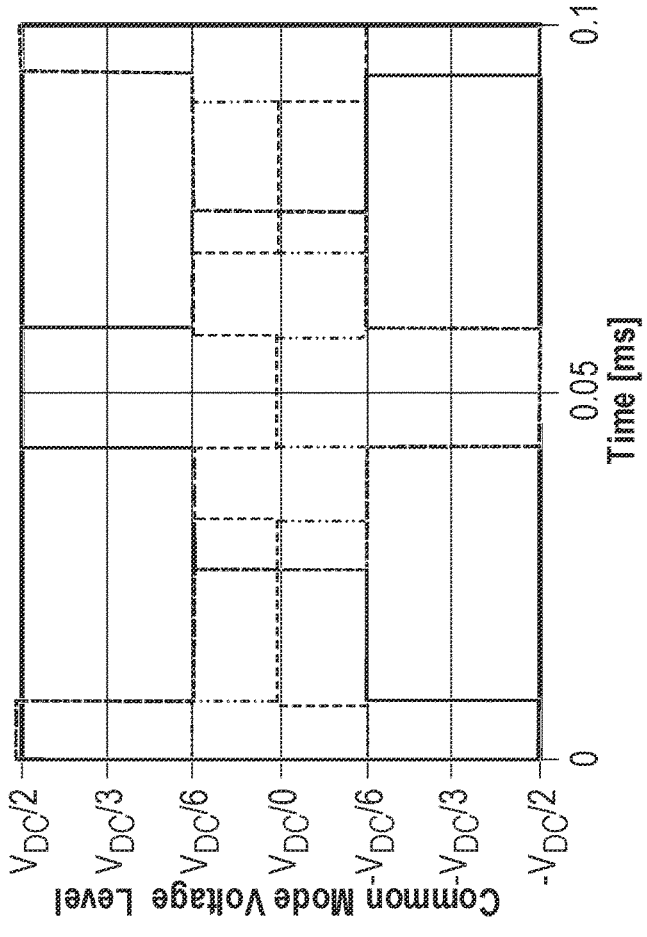
FIG. 10 illustrates waveforms of a dual three-phase inverter, in accordance with one or more embodiments of the disclosure.

Turning to FIG. 9B, a balanced six-phase inverter topology 910 is shown, in accordance with one or more embodiments of the disclosure. The number of switches (e.g., a total of 12 switches) is the same as the dual three-phase inverter topology 900 shown in FIG. 9A. The difference between the dual three-phase and the balanced six-phase is that the balanced six-phase inverter provides the same and opposite output voltages from each bundle of three-phase legs (for example, phase leg 912 and phase leg 914). As a result, the two CMVs may be the same and opposite in one switching cycle, as shown in FIG. 10 by a green and pink line. Theoretically, since the two CMVs are completely canceled, the CM EMI noise may be expected lower than that of the dual three-phase inverter. However, the CMVs are not completely canceled because there may be a delay between switches in practical operation.

Figure 9C:
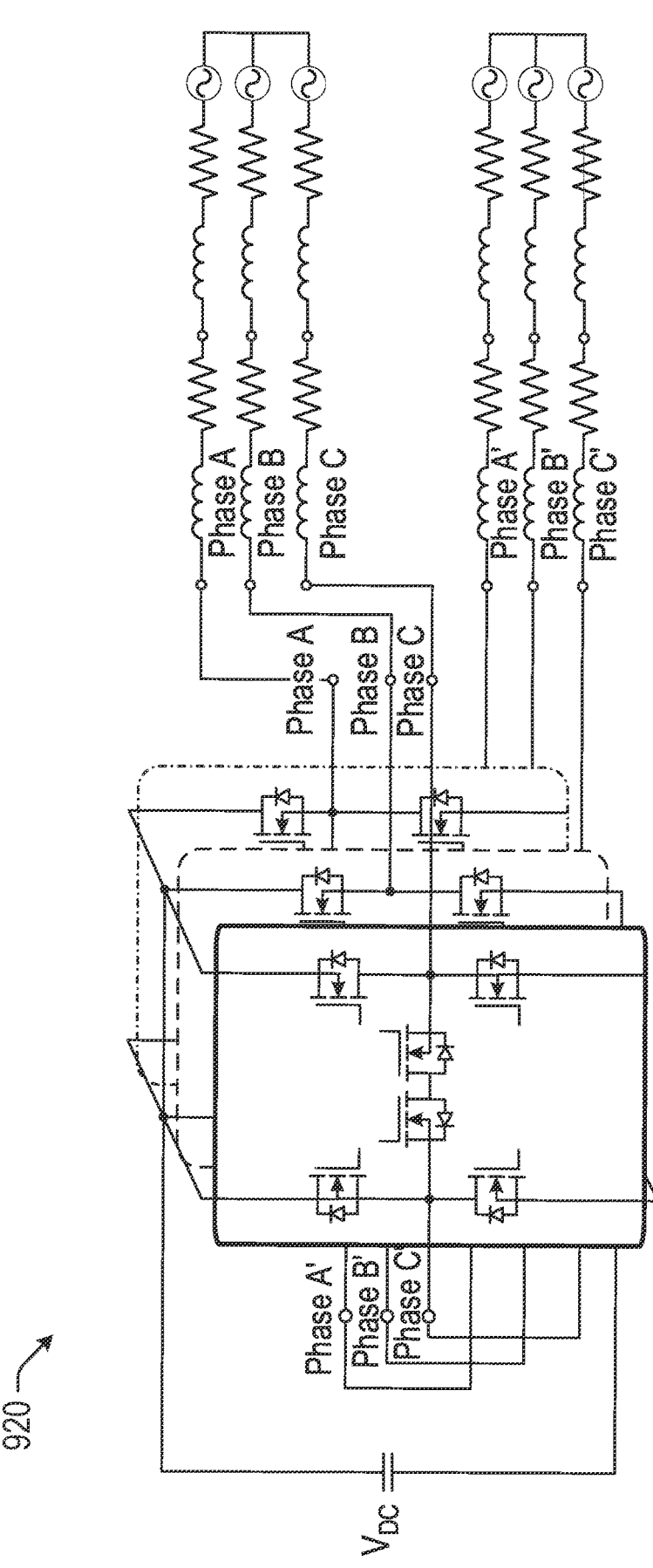

FIG. 9C illustrates an example single capacitor multi-level inverter topology 920 as described herein. The NPL H-type inverter has the same number of active switches with active neutral-point-clamped (ANPC) three-level inverters. There is no neutral current because of a single DC-link capacitor, not stacked. In one or more embodiments, the NPL H-type inverter may have four switching states, each having two output voltages associated with the level. For two switching states, the voltage level at each output is equal to half the DC-link voltage, with a first output voltage being positive and a second output voltage being negative for one switching state and the opposite polarity for a second switching state. The switching states may require three switches to be in the on-state to achieve each voltage level, while the a third state may require two for three-level operations with a single DC-link capacitor. The conventional three-phase multicarrier PWM techniques can be employed because combinations of switches may have the same and synchronized PWM signals.

Figure 11:
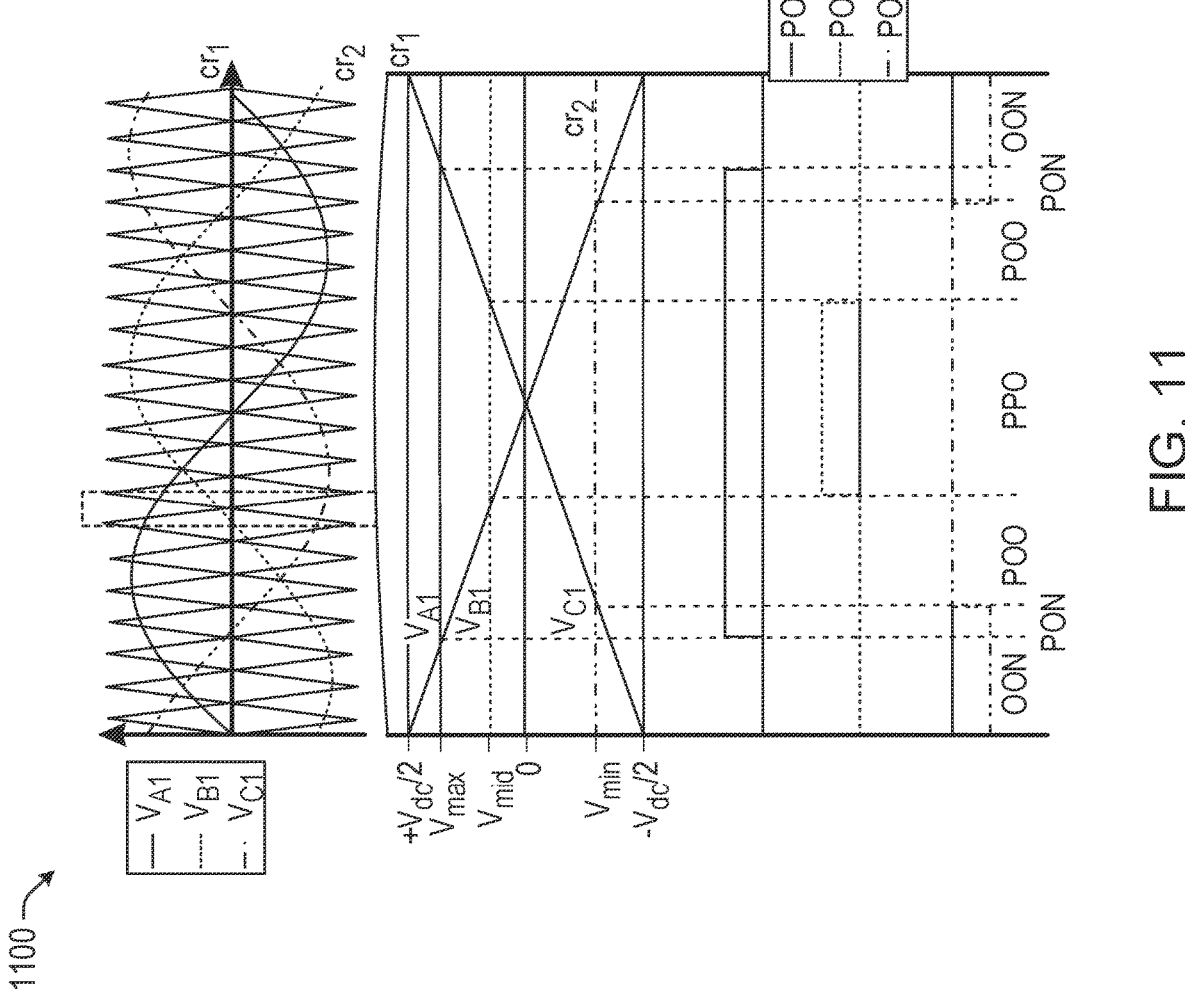
FIG. 11 illustrates voltage vectors for an NPL H-type inverter, in accordance with one or more embodiments of the disclosure.

In one or more embodiments, the NPL H-type inverter may have 27 voltage vectors, as shown in FIG. 11, which is identical to the conventional MLI topologies. The vectors may include, for example, zero, small, medium, and large vectors with CMV levels of 0, $\pm V_{DC}/6$, $\pm V_{DC}/3$, and $\pm V_{DC}/2$, respectively. The voltage vectors, CMV, and switching states of the H-type inverter are presented in FIG. 15 when multicarrier phase opposition disposition sine PWM (e.g., POD SPWM) is used. This inverter may generate two equal and opposite CMVs, $V_{cm1}$, defined as $(V_{an}+V_{bn}+V_{cn})/3$ from $V_{out1}$ and $V_{cm2}$, defined as $(V_{a'n}+V_{b'n}+V_{c'n})/3$ from $V_{out2}$, as shown in FIG. 10 during the same switching period.

Figures 12A, 12B:
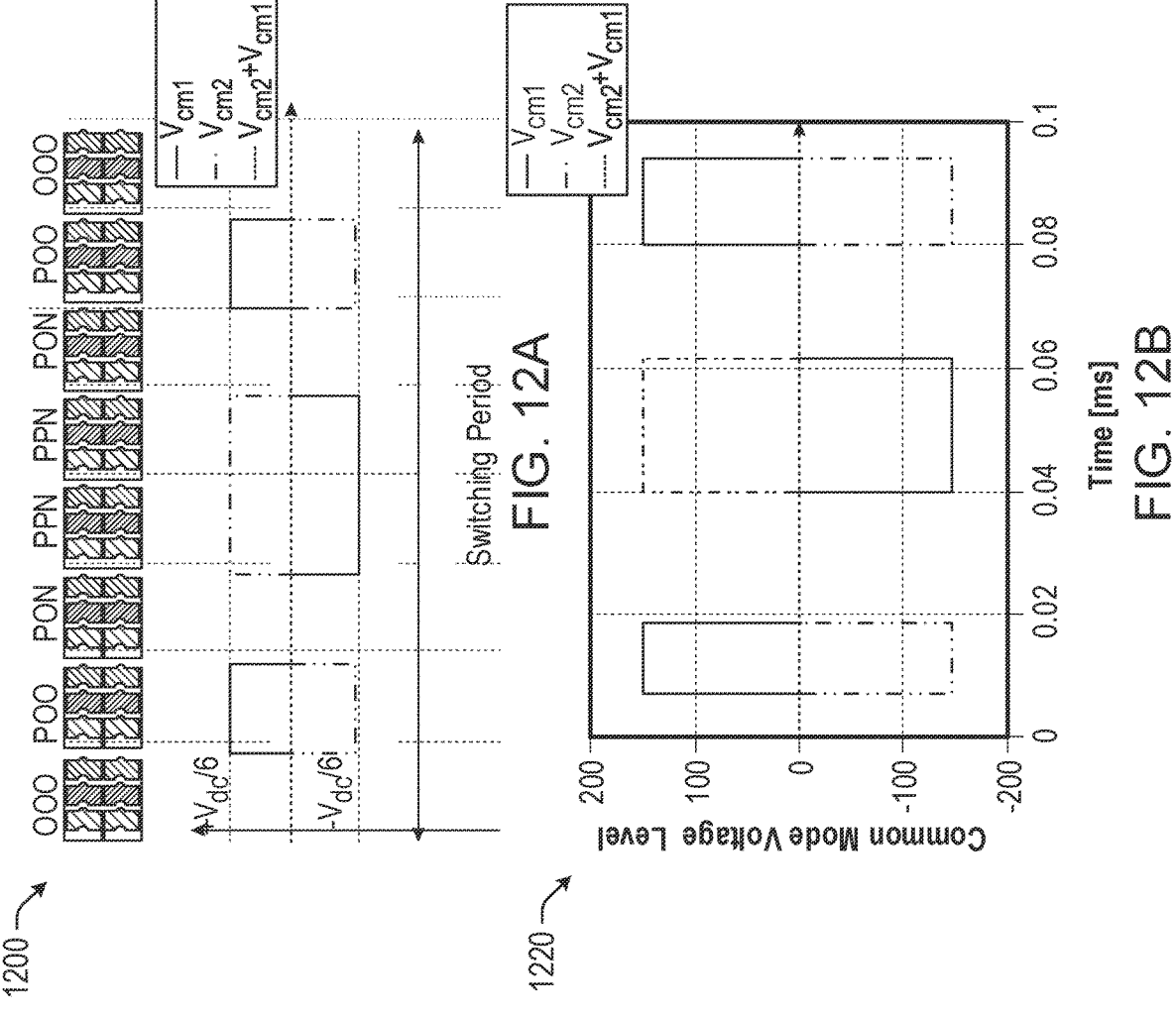
FIGS. 12A-12B illustrate plots associated with a CMV of an H-type multi-level inverter, in accordance with one or more embodiments of the disclosure.

The voltage vectors which have $\pm V_{DC}/6$ of CMV may only used in the switching cycle with POD SPWM, and the two CMVs cancel each other, as shown in FIG. 12A, leading to substantially reduced CM EMI noise magnitude in comparison with the other topologies.

FIGS. 12A-12B illustrate plots associated with a CMV of an H-type multi-level inverter in one switching cycle with phase offset disposition sinusoidal PWM (POD-SPWM). FIG. 12A shows a plot 1200 depicting active CMV cancellation in one switching period and associated switching states. FIG. 12B shows a plot 1220 depicting simulated active CMV cancellation in NPL H-type inverter.

FIGS. 13A-13F illustrate example plots of signals associated with an example multi-level inverter topology, in accordance with one or more embodiments of the disclosure. Particularly, FIGS. 13A-13C illustrate plots 1300 of signals associated with a dual two-level VSI (for example, the topology illustrated in FIG. 1A). FIGS. 13D-13F illustrate plots 1320 of signals associated with the multi-level NPL H-type inverter topology described herein (for example, the topology illustrated in FIG. 1C). As illustrated in the plots 1320, the NPL H-type inverter may produce 40% (or any other percentage) less ripple torque, 50% (or any other percentage) less DC-link voltage and current ripple, which may result in 50-60% (or any other percentage) capacitor reduction compared to the two-level VSI topology.

Figure 14A:
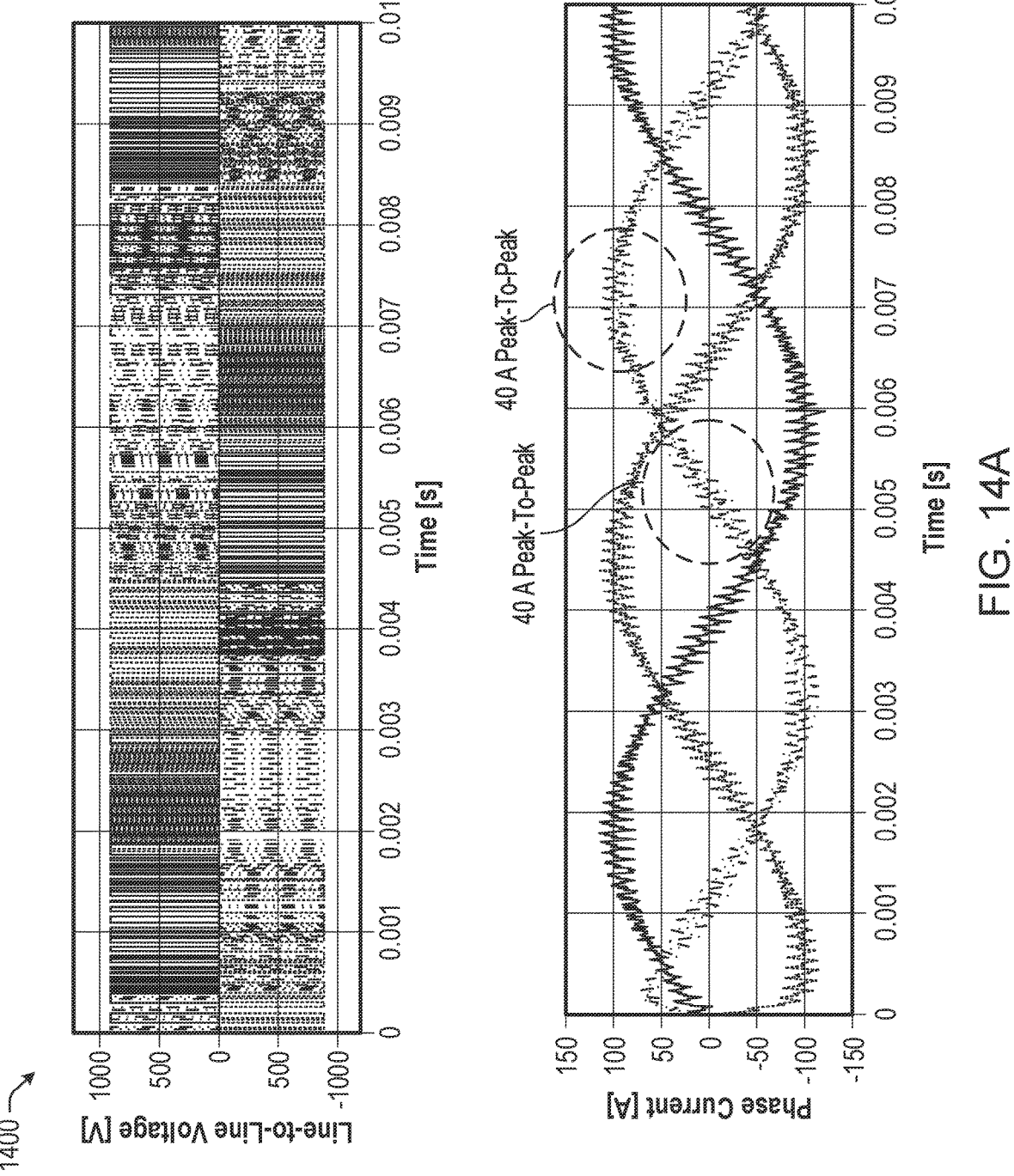
FIGS. 14A-14B illustrates additional example plots of signals associated with an example multi-level inverter topology, in accordance with one or more embodiments of the disclosure.
Figure 14B:
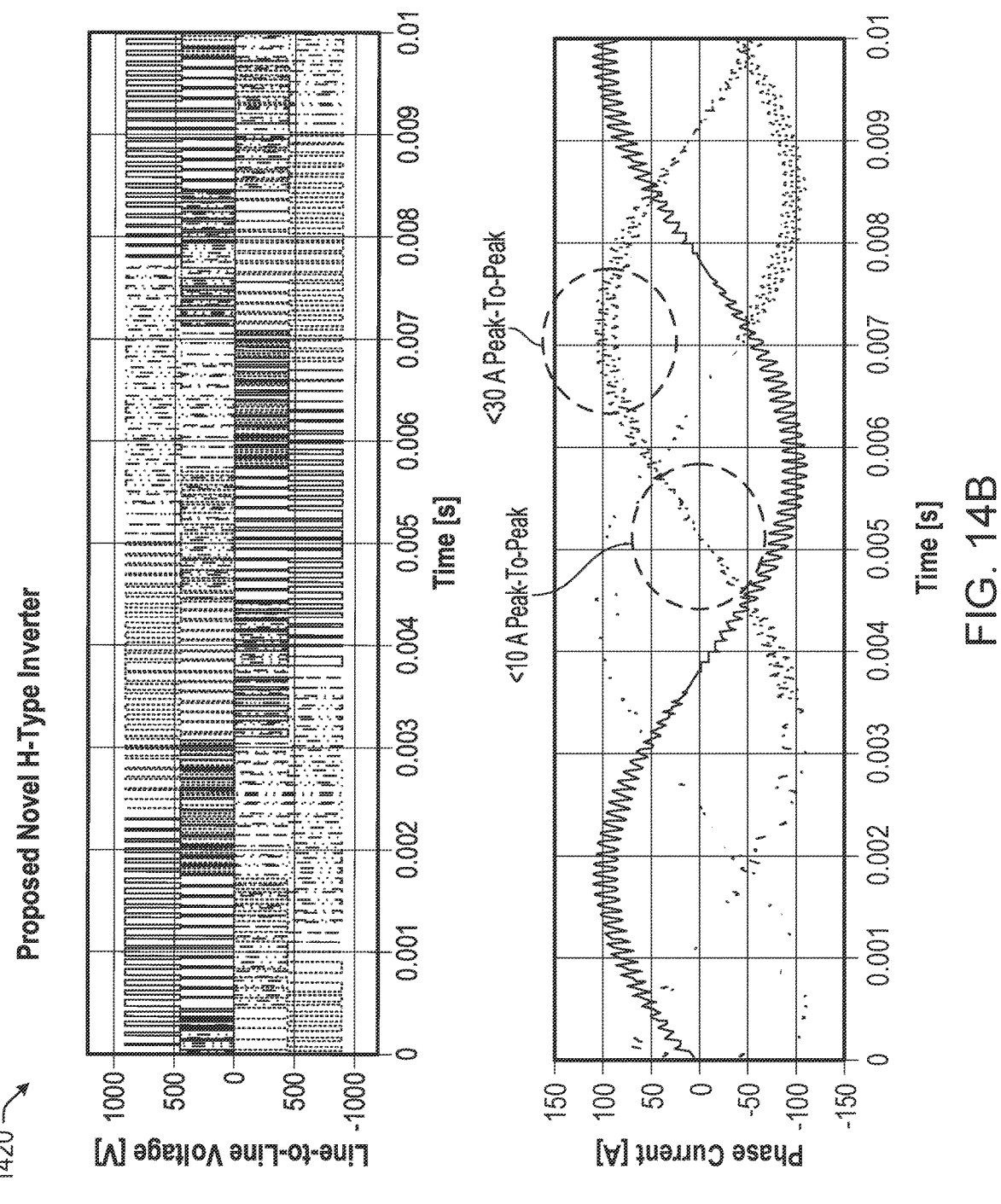

FIGS. 14A-14B illustrate example plots of signals associated with an example multi-level inverter topology, in accordance with one or more embodiments of the disclosure. Particularly, FIG. 14A illustrates plots 1400 of signals associated with a dual two-level VSI (for example, the topology illustrated in FIG. 2A). FIG. 14B illustrates plots 1420 of signals associated with the multi-level NPL H-type inverter topology described herein (for example, the topology illustrated in FIG. 2C). As illustrated in the plots 1420, the NPL H-type inverter may produce greater than 75% (or any other percentage) less ripple current when the modulation index is low (zero-crossing).

Figure 15:
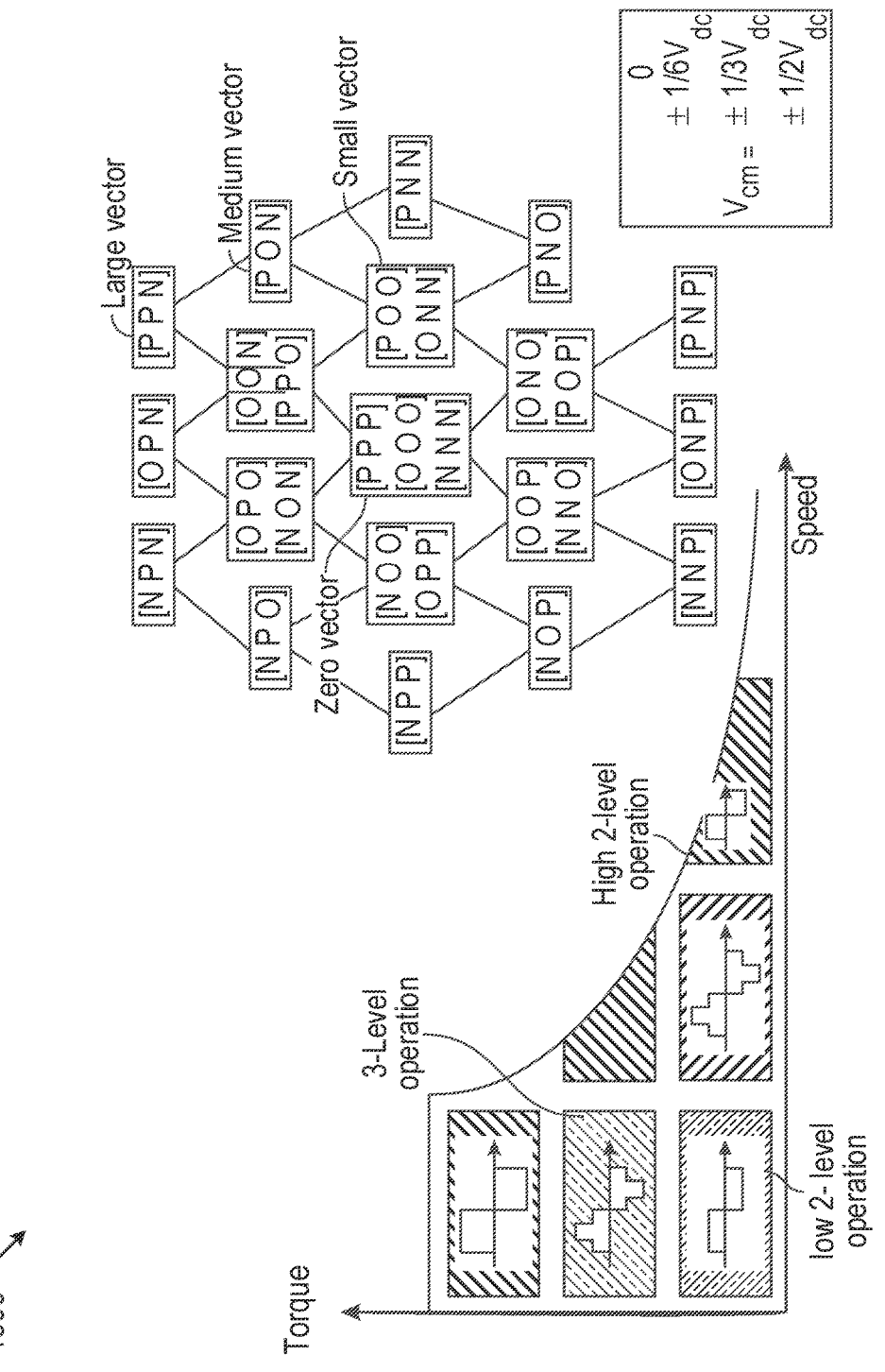
FIG. 15 illustrates additional example plots of signals associated with an example multi-level inverter topology, in accordance with one or more embodiments of the disclosure.

FIG. 15 illustrates example plots of signals associated with an example multi-level inverter topology, in accordance with one or more embodiments of this disclosure. Particularly, the plots 1500 illustrate that the NPL H-type inverter may generate 27 output voltage vectors with three voltage levels. This may enable flexible voltage utilization depending on an electric vehicle driving cycle. It should be noted that the number of output voltage vectors and voltage levels are merely exemplary and not intended to be limiting.

Figure 16:
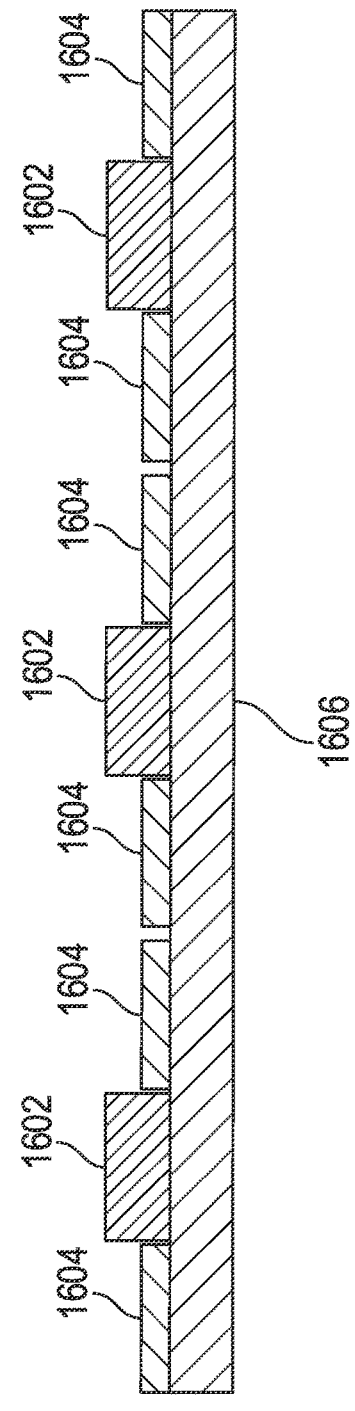
FIG. 16 illustrates an example of a planar NPL H-type inverter design, in accordance with one or more embodiments of this disclosure.

FIG. 16 illustrates an example of a planar NPL H-type inverter design 1600, in accordance with one or more embodiments of this disclosure. Particularly, the figure illustrates a configuration of the inverter design in which the IGBT modules 1602 and SiC modules 1604 may be arranged in a planar fashion on a cold plate 1606 (and/or any other surface type). It should be noted that while the figure illustrates specific dimensions and/or types of IGBT modules 1602 and/or SiC modules 1604, these configuration details are merely exemplary and are not intended to be limiting in any way.

FIG. 17 illustrates an example of a circular NPL H-type inverter design 1700, in accordance with one or more embodiments of this disclosure. Particularly, the circular NPL H-type inverter design 1700 may include the same one or more SiC modules 1704, one or more isolated 2-channel gate drives 1702, the one or more IGBT modules 1706, and/or the cold plate 1708. Instead of being arranged in a planar fashion on the cold plate 1708, however, the one or more SiC modules 1704 and/or the one or more IGBT modules may be arranged in a circular fashion around a circular cold plate 1708. This circular design may be advantageous in that is provides a symmetric layout for minimum parasitic inductances, minimal signal line, dc-bus design, and integrated motor drive. It should be noted that while the figure illustrates specific dimensions and/or types of IGBT modules 1702 and/or SiC modules 1704, these configuration details are merely exemplary and are not intended to be limiting in any way.

Figure 18:
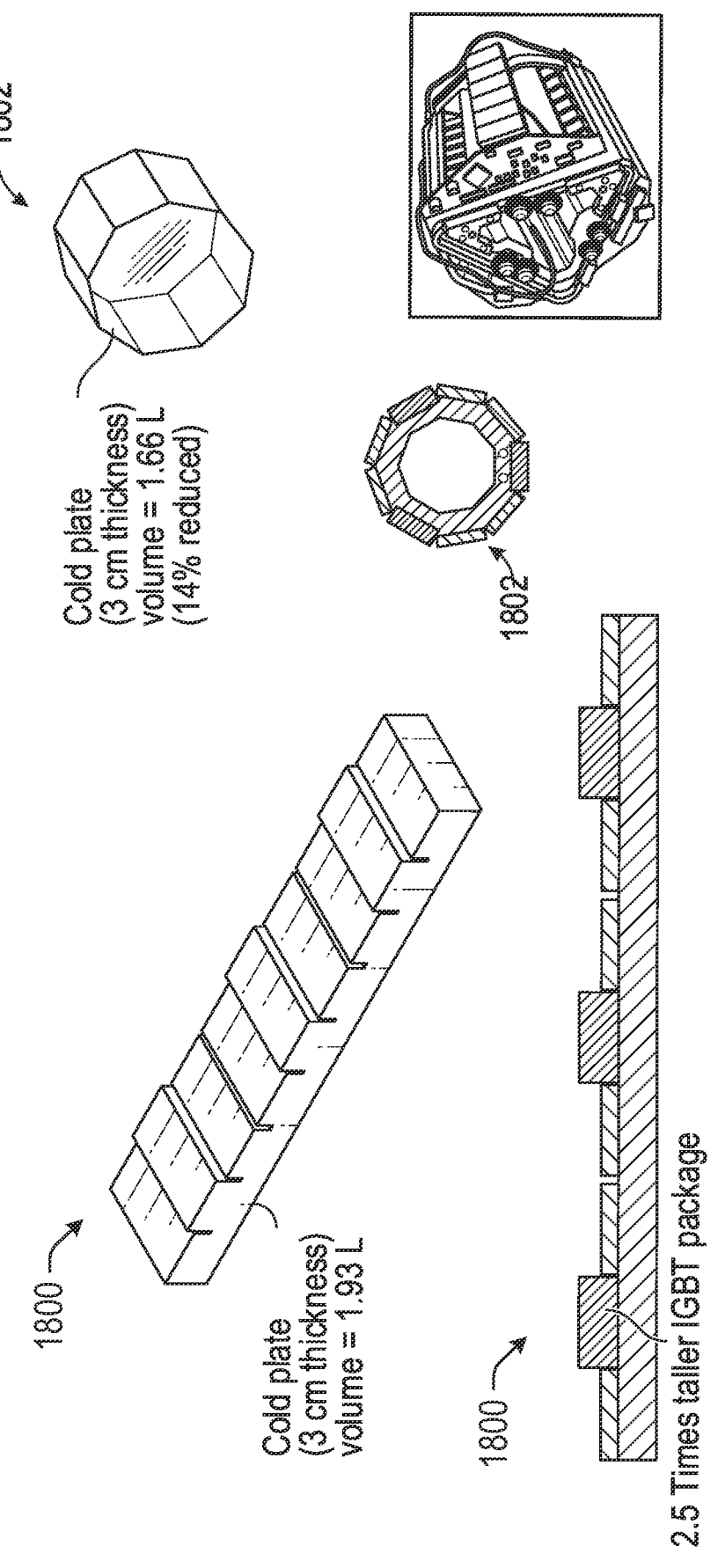
FIG. 18 illustrates a comparison of a planar NPL H-type inverter design and a circular NPL H-type inverter design, in accordance with one or more embodiments of this disclosure.

FIG. 18 illustrates a comparison of a planar NPL H-type inverter design 1800 and a circular NPL H-type inverter design 1802, in accordance with one or more embodiments of this disclosure. In one or more embodiments, the half-bride SiC MOSFET and Si IGBT device package heights may need to be less than 15 mm to achieve a greater than 90 kW/L power density. However, any other heights may be used as well.

Figure 19:
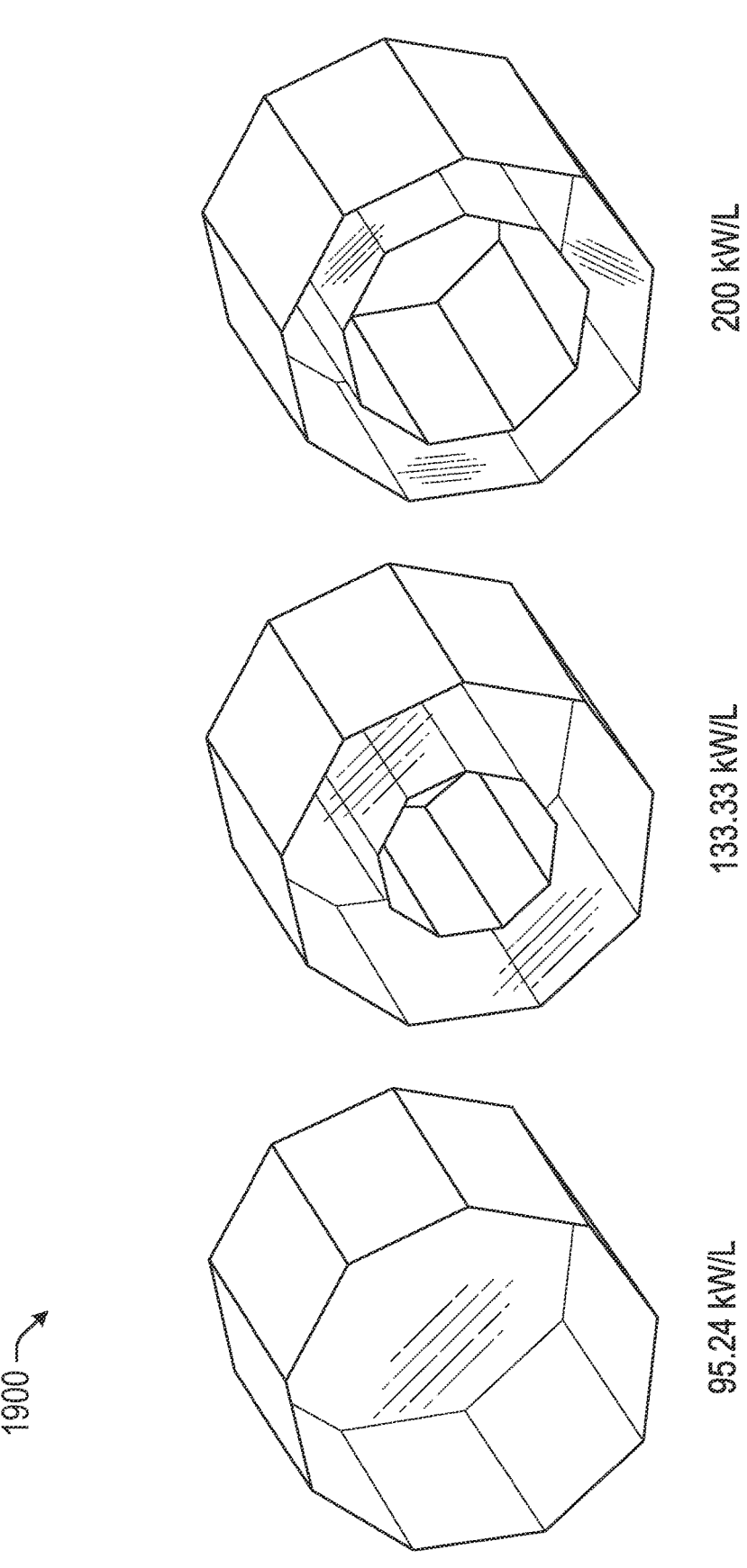
FIG. 19 illustrates an example of a circular NPL H-type inverter design, in accordance with one or more embodiments of this disclosure.

FIG. 19 illustrates an example of a circular NPL H-type inverter design 1900, in accordance with one or more embodiments of this disclosure. Particularly, FIG. 19 illustrates that the inner volume of the inverter may be reduced by reducing capacitor size, gate drive, and cold plate (for example, package height).

FIG. 20 illustrates an example method in accordance with one or more example embodiments of the disclosure. The method 2000 may be performed using computer-executable instructions stored on the memory of a device or system (for example, controller, machine 2200, and/or any other device or system described herein or otherwise).

At block 2002 of the method 2000, computer-executable instructions stored on the memory of a device or system may be executed to receive a direct current (DC) signal at an input of a multi-level power inverter, wherein the input of the multi-level power inverter includes one or more capacitors connected in parallel with a first circuit without a neutral point connection.

At block 2004 of the method 2000, computer-executable instructions stored on the memory of a device or system may be executed to cause, by one or more processors of the multi-level power inverter, a first set of one or more switches of the first circuit of the multi-level power inverter to open or close to produce a first non-zero voltage output, a second non-zero voltage output, and a first zero voltage output.

One or more operations of the methods, process flows, or use cases of FIGS. 1-20 may have been described above as being performed by a user device, or more specifically, by one or more program module(s), applications, or the like executing on a device. It should be appreciated, however, that any of the operations of the methods, process flows, or use cases of FIGS. 1-20 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-20 may be described in the context of the illustrative devices, it should be appreciated that such operations may be implemented in connection with numerous other device configurations.

The operations described and depicted in the illustrative methods, process flows, and use cases of FIGS. 1-20 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-20 may be performed.

Figure 21:
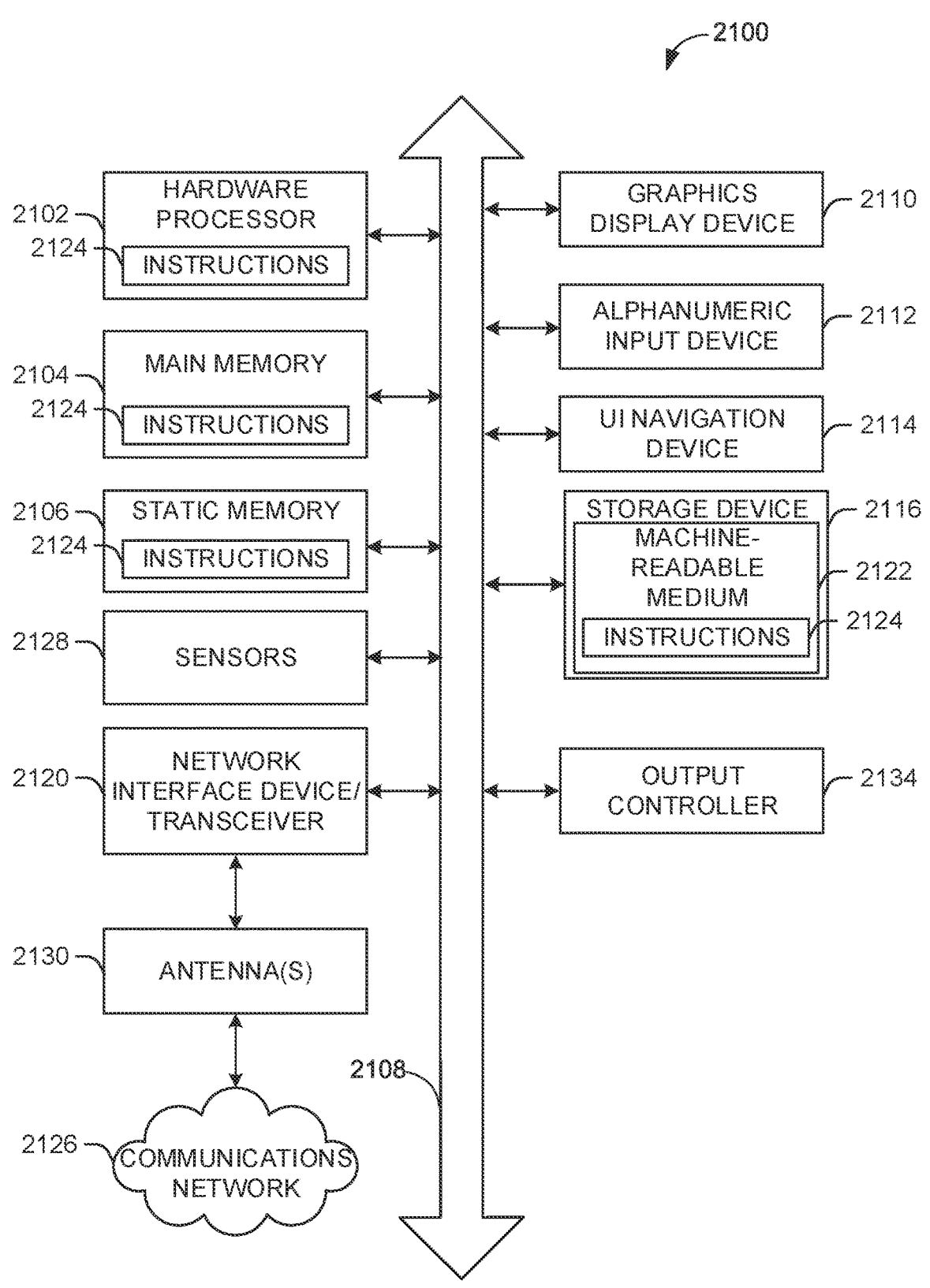
FIG. 21 illustrates an example computing system, in accordance with one or more embodiments of this disclosure.

FIG. 21 depicts a block diagram of an example computing system 2100 upon which any of one or more techniques (e.g., methods) may be performed, in accordance with one or more example embodiments of the present disclosure. In other embodiments, the computing system 2100 may operate as a standalone device or may be connected (e.g., networked) to other machines. In a networked deployment, the computing system 2100 may operate in the capacity of a server machine, a client machine, or both in server-client network environments. In an example, the computing system 2100 may act as a peer machine in peer-to-peer (P2P) (or other distributed) network environments. The computing system 2100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

The machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The computing system 2100 may further include a graphics display device 2110, an alphanumeric input device 2112 (e.g., a keyboard), and a user interface (UI) navigation device 2114 (e.g., a mouse). In an example, the graphics display device 2110, alphanumeric input device 2112, and UI navigation device 2114 may be a touch screen display. The computing system 2100 may additionally include a storage device (i.e., drive unit) 2116, a network interface device/transceiver 2120 coupled to antenna(s) 2130, and one or more sensors 2128, such as a global positioning system (GPS) sensor, a compass, an accelerometer, or other sensor. The computing system 2100 may include an output controller 2134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within the static memory 2106, or within the hardware processor 2102 during execution thereof by the computing system 2100. In an example, one or any combination of the hardware processor 2102, the main memory 2104, the static memory 2106, or the storage device 2116 may constitute machine-readable media.

While the machine-readable medium 2122 is illustrated as a single medium, the term "machine-readable medium" may include a single medium or multiple media (e.g., a centralized or distributed database, and/or associated caches and servers) configured to store the one or more instructions 2124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the computing system 2100 and that cause the computing system 2100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device/ transceiver 2120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 2120 may include one or more physical jacks (e.g., Ethernet, coaxial, or phone jacks) or one or more antennas to connect to the communications network 2126. In an example, the network interface device/transceiver 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the computing system 2100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A multi-level inverter comprising:
a first circuit comprising a first set of one or more switches with a first output node and a second output node;
a second circuit comprising a second set of one or more switches with a third output node and a fourth output node;
a third circuit comprising a third set of one or more switches with a fifth output node and a sixth output node, wherein the first output node, the third output node, and the fifth output node form a first three-phase output, wherein each of the first, the third, and the fifth output nodes are configured to independently generate a first non-zero voltage, a second non-zero voltage, and a first zero voltage, wherein the second output node, the fourth output node, and the sixth output node form a second three-phase output, and wherein each of the second, the fourth, and the sixth output nodes are configured to independently generate a third non-zero voltage, a fourth non-zero voltage, and a second zero voltage;
a first balanced three-phase load configured to receive three outputs from the first three-phase output; and
a second balanced three-phase load configured to receive three outputs from a second three-phase output, wherein the first balanced three-phase load and the second balanced three-phase load form active neutral points.

2. The multi-level inverter of claim 1, wherein the first set of one or more switches, the second set of one or more switches, and the third set of one or more switches are each provided in a neutral-point-less (NPL) H-type configuration or an NPL X-type configuration.

3. The multi-level inverter of claim 1, further comprising:
a controller comprising:
memory that stores computer-executable instructions; and
one or more processors configured to access the memory and execute the computer-executable instructions to:
cause, at a first time, a first switch and second switch of the first set of one or more switches to close;
cause, at a second time, a third switch and fourth switch of the first set of one or more switches to close; and
cause, at a third time, at least one of a fifth switch and a sixth switch of the first set of one or more switches to close.

4. The multi-level inverter of claim 1, wherein the one or more switches are transistors.

5. The multi-level inverter of claim 1, wherein the first balanced three-phase load and the second balanced three-phase load are 180 degrees phase shifted with two separate neutral points, and wherein the first and second zero voltages are only generated by a combination of two or more instances of the first, the second, and the third circuits as well as both of the first and the second balanced three-phase loads.

6. The multi-level inverter of claim 1, further comprising one or more capacitors connected in parallel with an input of the multi-level inverter without a neutral point connection.

7. A system comprising:
a direct current (DC) power source;
a multi-level inverter configured to receive a DC signal from the DC power source, the multi-level inverter comprising:
a first circuit comprising a first set of one or more switches with a first output node and a second output node;
a second circuit comprising a second set of one or more switches with a third output node and a fourth output node;
a third circuit comprising a third set of one or more switches with a fifth output node and a sixth output node, wherein the first output node, the third output node, and the fifth output node form a first three-phase output, wherein each of the first, the third, and the fifth output nodes are configured to independently generate a first non-zero voltage, a second non-zero voltage, and a first zero voltage, wherein the second output node, the fourth output node, and the sixth output node form a second three-phase output, and wherein each of the second, the fourth, and the sixth output nodes are configured to independently generate a third non-zero voltage, a fourth non-zero voltage, and a second zero voltage;

a first balanced three-phase load configured to receive three outputs from the first three-phase output; and a second balanced three-phase load configured to receive three outputs from a second three-phase output, wherein the first balanced three-phase load and the second balanced three-phase load form active neutral points.

8. The system of claim 7, wherein the first set of one or more switches, the second set of one or more switches, and the third set of one or more switches are each provided in a neutral-point-less (NPL) H-type configuration or an NPL X-type configuration.

9. The system of claim 7, further comprising:

a controller comprising:

memory that stores computer-executable instructions; and one or more processors configured to access the memory and execute the computer-executable instructions to:

cause, at a first time, a first and second switch of the first set of one or more switches to close;

cause, at a second time, a third and fourth switch of the first set of one or more switches to close; and cause, at a third time, at least one of a fifth and a sixth switch of the first set of one or more switches to close.

10. The system of claim 7, wherein the one or more switches are transistors.

11. A method comprising:

receiving a direct current (DC) signal at an input of a multi-level power inverter, wherein the multi-level power inverter includes a first circuit comprising a first set of one or more switches with a first output node and a second output node, a second circuit comprising a second set of one or more switches with a third output node and a fourth output node, and a third circuit comprising a third set of one or more switches with a fifth output node and a sixth output node, wherein the first output node, the third output node, and the fifth output node form a first three-phase output, and wherein the second output node, the fourth output node, and the sixth output node form a second three-phase output;

independently generating, by each of the first, the third, and the fifth output nodes, a third non-zero voltage, a fourth non-zero voltage, and a second zero voltage;

independently generating, by each of the second, the fourth, and the sixth output nodes, a third non-zero voltage, a fourth non-zero voltage, and a second zero voltage;

receiving, by a first balanced three-phase load, three outputs from the first three-phase output; and receiving, by a second balanced three-phase load, three outputs from the second three-phase output, wherein the first three-phase load and the second three-phase load form active neutral points.

* * * * *